United States Patent
Shao et al.

(10) Patent No.: US 12,047,633 B2
(45) Date of Patent: Jul. 23, 2024

(54) DISPLAY METHOD AND DISPLAY APPARATUS

(71) Applicant: HISENSE VISUAL TECHNOLOGY CO., LTD., Shandong (CN)

(72) Inventors: Xiaoming Shao, Shandong (CN); Cunfang Hu, Shandong (CN); Hui Zhang, Shandong (CN)

(73) Assignee: Hisense Visual Technology Co., Ltd., Qingdao (CN)

( * ) Notice: Subject to any disclaimer, the term of this patent is extended or adjusted under 35 U.S.C. 154(b) by 158 days.

(21) Appl. No.: 17/948,589

(22) Filed: Sep. 20, 2022

(65) Prior Publication Data

US 2023/0020264 A1 Jan. 19, 2023

Related U.S. Application Data

(63) Continuation of application No. PCT/CN2020/133645, filed on Dec. 3, 2020.

(30) Foreign Application Priority Data

Sep. 15, 2020 (CN) .......................... 202010969342.X
Sep. 17, 2020 (CN) .......................... 202010982355.0

(51) Int. Cl.
*H04N 21/431* (2011.01)
*H04N 21/422* (2011.01)

(52) U.S. Cl.
CPC ..... *H04N 21/4314* (2013.01); *H04N 21/4221* (2013.01)

(58) Field of Classification Search
CPC ........... H04N 21/4314; H04N 21/4221; H04N 21/47214; H04N 21/4821; H04N 21/4583
See application file for complete search history.

(56) References Cited

U.S. PATENT DOCUMENTS

| 7,710,505 | B2 | 5/2010 | Moore |
| 7,971,219 | B2 | 6/2011 | Iino |
| 2005/0097602 | A1* | 5/2005 | Murakami ......... H04N 21/4583 |
| | | | 348/E5.103 |

(Continued)

FOREIGN PATENT DOCUMENTS

| CN | 1698351 A | 11/2005 |
| CN | 101123701 A | 2/2008 |

(Continued)

OTHER PUBLICATIONS

European Search Report, Application No. 20953951.9 dated Jan. 30, 2024.

*Primary Examiner* — Kunal Langhnoja
(74) *Attorney, Agent, or Firm* — Meunier Carlin & Curfman LLC

(57) ABSTRACT

The present application discloses a display method and a display apparatus; and the display apparatus includes a controller configured to determine, on the basis of a schedule list and target program display information corresponding to a target EPG page, whether there is a schedule conflict; if there is a schedule conflict, determining a specified channel and specified time period corresponding to the schedule conflict; obtaining a specified schedule identifier corresponding to the specified channel in the specified time period, and displaying the specified schedule identifier on specified program information.

14 Claims, 12 Drawing Sheets

(56) References Cited

U.S. PATENT DOCUMENTS

| | | | |
|---|---|---|---|
| 2005/0229211 A1* | 10/2005 | Iino | H04N 5/782 |
| | | | 386/293 |
| 2006/0083483 A1 | 4/2006 | Suzuki | |
| 2008/0040752 A1 | 2/2008 | Kawana | |
| 2009/0031357 A1* | 1/2009 | Ko | H04N 5/782 |
| | | | 725/50 |
| 2013/0185752 A1 | 7/2013 | Itagaki et al. | |
| 2013/0326556 A1 | 12/2013 | Kim | |
| 2014/0373061 A1 | 12/2014 | Tokikura et al. | |
| 2014/0380375 A1* | 12/2014 | Yan | H04N 21/47202 |
| | | | 725/52 |
| 2015/0309700 A1 | 10/2015 | Li et al. | |

FOREIGN PATENT DOCUMENTS

| | | |
|---|---|---|
| CN | 101548541 A | 9/2009 |
| CN | 102576563 A | 7/2012 |
| CN | 102780915 A | 11/2012 |
| CN | 103197770 A | 7/2013 |
| CN | 103227940 A | 7/2013 |
| CN | 103607633 A | 2/2014 |
| CN | 104093076 A | 10/2014 |
| CN | 105100922 A | 11/2015 |
| CN | 106470344 A | 3/2017 |
| CN | 106954081 A | 7/2017 |
| CN | 107801082 A | 3/2018 |
| EP | 1768393 A1 | 3/2007 |
| EP | 1871104 B1 | 12/2007 |
| JP | 2005191944 A | 7/2005 |
| JP | 2013074457 A | 4/2013 |

\* cited by examiner

DISPLAY METHOD AND DISPLAY APPARATUS

CROSS REFERENCE TO RELATED APPLICATIONS

This application is a continuation application of International Application No. PCT/CN2020/133645, filed on Dec. 3, 2020, which claims priority to the Chinese Patent No. CN 202010982355.0, filed to the China Patent Office on Sep. 17, 2020 and entitled "METHOD AND DISPLAY APPARATUS FOR RAPIDLY DISPLAYING PROGRAM SCHEDULE ICON", and claims priority to the Chinese Patent No. CN 202010969342.X, filed to the China Patent Office on Sep. 15, 2020 and entitled "METHOD AND DISPLAY APPARATUS FOR TURNING EPG PAGE", the entire contents of which are incorporated herein by reference.

FIELD

The disclosure relates to the technical field of display, in particular to a display method and a display apparatus.

BACKGROUND

With rapid development of a display apparatus, functions of the display apparatus will be increasingly rich, and its performance is more and more powerful. At present, the display apparatuses include smart televisions, smart Set-Top-Boxes, smart boxes, products with a smart display screen, and the like. Taking the smart television for an example, an existing smart television has a digital television function, and a user can watch more television channels and television programs through the smart television.

SUMMARY

A first aspect of an implementation of the disclosure provides a display method and a display apparatus. The display apparatus includes: a display, configured to display an electronic program guide (EPG) page, where a broadcast time period, a channel and program information are presented on the EPG page; and a controller connected with the display and configured to: obtain a schedule list and target program display information corresponding to a target EPG page presented on the display, where the schedule list includes information of one or more scheduled programs; determine whether there is a schedule conflict based on the target program display information on the target EPG page and the information of the one or more scheduled programs in the schedule list; determine a specific channel and a specific time period corresponding to the schedule conflict in response to the schedule conflict existing; and obtain a specific schedule identifier corresponding to the specific channel within the specific time period, and display a specific schedule identifier on specific program information corresponding to the specific channel, where the specific schedule identifier is an identifier of the specific program information corresponding to the specific channel.

A second aspect of the embodiments of the disclosure further provides a display method and a display apparatus. The display apparatus includes: a display, configured to present an EPG page with a program information region, where the program information region includes a broadcast time period and a plurality of pieces of program information; a remote control, where a plurality of directional keys are configured on the remote control and used for indicating movement directions of a focus while the focus moves through different program information on the EPG page and causing the EPG page to turn; a controller in connection with the display and the remote control and configured to: receive a long-pressing focus move instruction for indicating continuous move of a focus on a plurality of pieces of program information presented on each EPG page, where the long-pressing focus move instruction is generated by continuously pressing a direction key on the remote control; in response to the long-pressing focus move instruction, receive a current number of times of page turning operations during the continuous move of the focus and a number of times of key pressing events generated during long-pressing of the direction key; in response to the current number of times of page turning operations being greater than a preset threshold of the number of times of constant-speed page turning, obtain a page turning speed determination value for performing a rapid page turning operation, where the page turning speed determination value indicates a number of times of key pressing events required for performing one time of page turning operation; and perform rapid page turning operation for each EPG page based on a number of times of key pressing events currently received and the page turning speed determination value, and display a corresponding broadcast time period on an EPG page after performing the rapid page turning operation.

In some embodiments of the disclosure, when receiving the current number of times of page turning triggered during the continuous move of the focus, the controller is further configured to: in response to the long-pressing focus move instruction, cause the focus to move through each piece of program information on a current EPG page; upon the focus moving to program information on a boundary of the program information region of the current EPG page, perform page turning action to cause the focus to skip from the current EPG page to a next EPG page following the current EPG page; and accumulate a current number of times of the page turning actions triggered during the move of the focus on EPG pages.

In some embodiments of the disclosure, when performing the rapid page turning operation for each EPG page based on the current received number of times of key pressing events and the page turning speed determination value, the controller is further configured to: determine a remainder when a number of times of key pressing events currently received is divided by the page turning speed determination value; and in response to the remainder being 0, perform rapid page turning operation for each EPG page.

In some embodiments of the disclosure, when performing the rapid page turning operation for each EPG page, the controller is further configured to: skip from the current EPG page presented on the display to a next EPG page according to the page turning speed determination value; obtain a next broadcast time period on the next EPG page; and present the next broadcast time period on the program information region of the next EPG page.

In some embodiments of the disclosure, when obtaining the next broadcast time period corresponding to the next EPG page, the controller is further configured to: obtain a current broadcast time period presented on the program information region of the current EPG page; and calculate the next broadcast time period corresponding to the next EPG page based on the current broadcast time period and a new number of times of page turning operation after the rapid page turning operation is performed.

In some embodiments of the disclosure, the controller is further configured to: obtain the maximum number of times of page turning operations which is capable of being generated when the rapid page turning action operations are performed according to the page turning speed determination value; when a updated number of times of page turning operations after rapid page turning operations is greater than the maximum number of times of page turning operations, reduce the page turning speed determination value to obtain a new page turning speed determination value; and according to the new page turning speed determination value, perform rapid page turning operations for the rest of EPG pages except for pages where the rapid page turning operations are already performed according to the page turning speed determination value.

In some embodiments of the disclosure, the controller is further configured to: determine whether a releasing instruction for releasing the direction key is received; in response to the releasing instruction, stop the rapid page turning operation, and obtain program information corresponding to an EPG page currently presented on the display; and update the EPG page currently presented on the display to include the program information in the program information region of the EPG page.

A third aspect of an implementation of the disclosure further provides a display method, including receiving a long-pressing focus move instruction for indicating continuous move of a focus through a plurality of pieces of program information presented on each EPG page, where the long-pressing focus move instruction is generated by continuously pressing a direction key on a remote control; in response to the long-pressing focus move instruction, receiving a current number of times of page turning operations during the continuous move of the focus and a number of times of key pressing events generated during long-pressing of the direction key; in response to the current number of times of page turning operations being greater than a preset threshold of the number of times of constant-speed page turning, obtaining a page turning speed determination value for performing a rapid page turning operation, where the page turning speed determination value indicates a number of times of key pressing events required for performing one time of page turning operation; and performing rapid page turning operation for each EPG page based on a number of times of key pressing events currently received and the page turning speed determination value, and displaying a corresponding broadcast time period on an EPG page after performing the rapid page turning operation.

In some embodiments of the disclosure, an operation of the rapid page turning for each EPG page based on a number of times of key pressing events currently received and the page turning speed determination value includes: calculating a remainder when the number of times of key pressing events currently received is divided by the page turning speed determination value; and performing the rapid page turning operation for each EPG page when the remainder is 0.

In some embodiments of the disclosure, the display method further includes obtaining the maximum number of times of page turning operations which is capable of being generated when the rapid page turning operations are performed according to the page turning speed determination value; reducing the page turning speed determination value to obtain a new page turning speed determination value when a updated number of times of page turning operations after the rapid page turning operations is greater than the maximum number of times of page turning operations; and performing, according to the new page turning speed determination value, the rapid page turning operations for the rest of EPG pages except for pages where the rapid page turning operations have been performed according to the page turning speed determination value.

BRIEF DESCRIPTION OF THE DRAWINGS

In order to describe embodiments of the disclosure more clearly, accompanying drawings in the embodiments will be briefly described below. Apparently, those skilled in the art can obtain other accompanying drawings according to these accompanying drawings without creative work.

DETAILED DESCRIPTION OF THE EMBODIMENTS

In order to make objectives and implementations of the disclosure clearer, exemplary implementations of the disclosure will be described clearly and completely below with reference to the accompanying drawings in exemplary embodiments of the disclosure. Apparently, the described exemplary embodiments are merely some but not all of the embodiments of the disclosure.

It is noted that brief description of terms in the disclosure is merely for the sake of understanding the following described implementations instead of intending to limit the implementations of the disclosure. Unless otherwise stated, these terms should be understood as plain and ordinary meaning.

Terms "first", "second", "third" and the like in the specification, claims and the above accompanying drawings in the disclosure are used for distinguishing similar or like objects or entities but not necessarily intend to limit a specific sequence or a specific order unless otherwise noted. It should be understood that terms used in this way can be interchanged as needed.

Terms "include" and "have" and any of their variants intend to cover without excluding other possible elements, for example, products or devices including a series of components are not necessarily limited to the components listed clearly but may include other components which are not clearly listed or are inherent to these products or devices.

A term "module" refers to a combination of any of known or later developed hardware, software, firmware, artificial intelligence, fuzzy logic or hardware or/and software codes and can execute functions related to the element.

Figure 1:
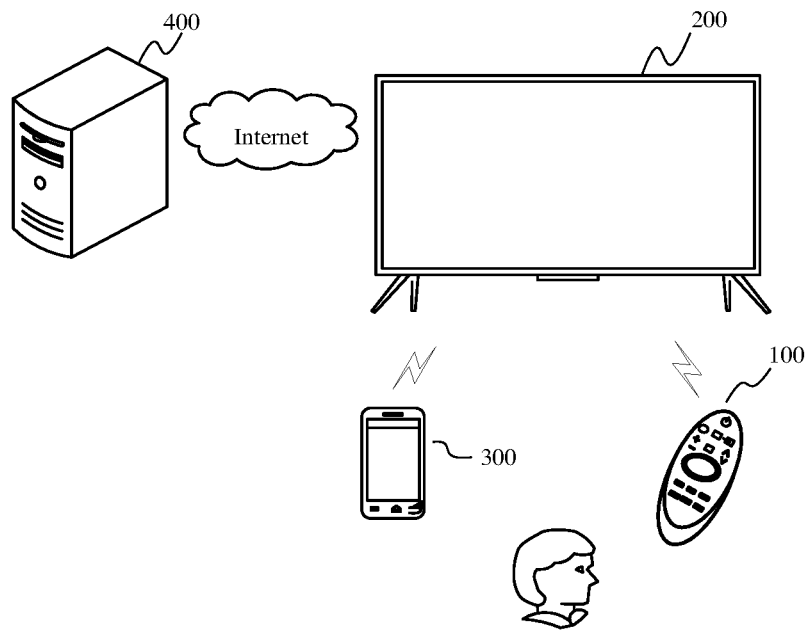
FIG. 1 shows a schematic diagram of an operation scenario between a display apparatus and a control device according to some embodiments.

FIG. 1 is a schematic diagram of a scenario of a display apparatus according to embodiments. As shown in FIG. 1, the display apparatus 200 further performs data communication with a server 400. A user can operate the display apparatus 200 through a smart device 300 or a control device 100.

In some embodiments, the control device 100 may be a remote control. Communication between the remote control and the display apparatus includes at least one of an infrared protocol communication, a Bluetooth protocol communication and other short-distance communication modes; and the display apparatus 200 is controlled in a wireless or wired mode. The user may input a command through ways such as keys on the remote control, speech input, control panel input and the like, so as to control the display apparatus 200.

In some embodiments, the smart device 300 may include any one of a mobile terminal, a tablet computer, a computer, a notebook computer, an augmented reality (AR)/virtual reality (VR) device and the like.

In some embodiments, the display apparatus 200 may be controlled by using the smart device 300. For example, the display apparatus 200 is controlled by using an application which runs on the smart device.

In some embodiments, data communication may also be performed by using the smart device 300 and the display apparatus.

In some embodiments, the display apparatus 200 may further be controlled in other modes besides the control device 100 and the smart device 300. For example, the display apparatus 200 may be controlled by directly receiving a speech command from the user through a module used for obtaining the speech command and configured in the display apparatus, or the display apparatus 200 may be controlled by receiving the speech command from the user through a speech control device outside the display apparatus.

In some embodiments, the display apparatus 200 further performs data communication with a server 400. The display apparatus 200 may be allowed to perform communication connection through a local area network (LAN), a wireless local area network (WLAN) and other networks. The server 400 may provide various contents and interactions for the display apparatus 200. The server 400 may be in a form of a cluster, or a plurality of clusters, and may include servers of the same type or different types.

In some embodiments, a step executed by one executing body may be performed by another executing body as needed. Exemplarily, a step executed by a server may be shift to a display apparatus in data communication therewith according to demands, and vice versa.

Figure 2:
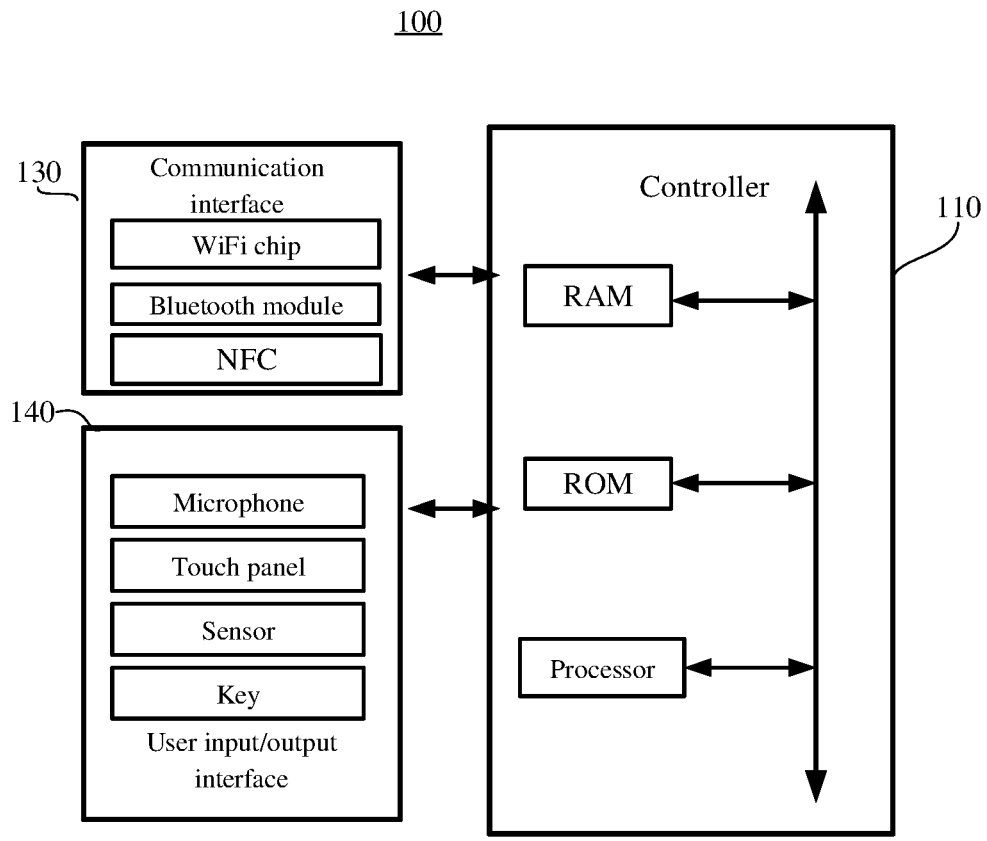
FIG. 2 shows a block diagram of hardware configuration of a control device 100 according to some embodiments.

FIG. 2 shows a block diagram of configuration of a control device 100 according to an exemplary embodiment. As shown in FIG. 2, the control device 100 includes a controller 110, a communication interface 130, a user input/output interface 140, a memory and a power source.

The control device 100 may receive a command from a user, converts the command to an instruction which can be recognized and responded by the display apparatus 200 and plays an interactive medium role between the user and the display apparatus 200.

In some embodiments, the communication interface 130 is used for communicating with the outside and includes at least one of a WIFI chip, a Bluetooth module, a near field communication (NFC) and the like.

In some embodiments, the user input/output interface 140 includes at least one of a microphone, a touch panel, a sensor, keys and the like.

Figure 3:
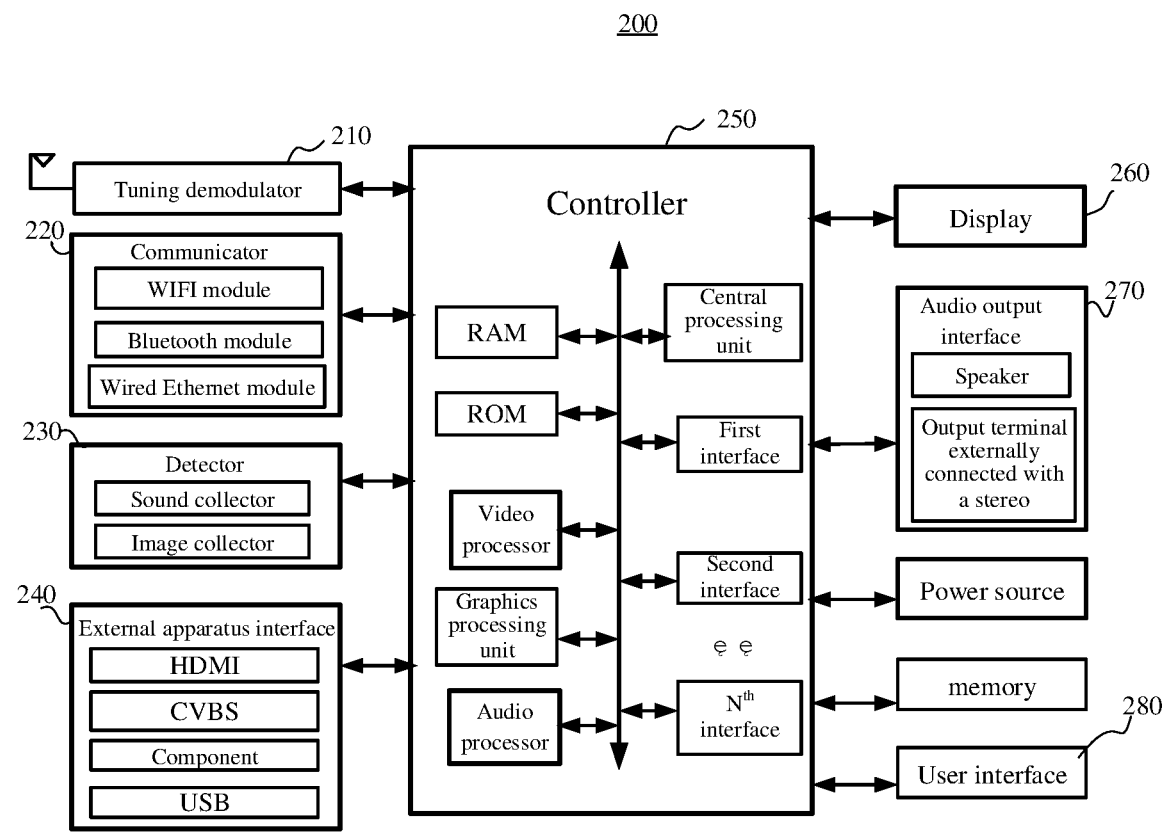
FIG. 3 shows a block diagram of hardware configuration of a display apparatus 200 according to some embodiments.

FIG. 3 shows a block diagram of hardware configuration of a display apparatus 200 according to an exemplary embodiment.

In some embodiments, the display apparatus 200 includes at least one of a tuning demodulator 210, a communicator 220, a detector 230, an external apparatus interface 240, a controller 250, a display 260, an audio output interface 270, a memory, a power source or a user interface.

In some embodiments, the controller includes a central processing unit (CPU), a video processor, an audio processor, a graphics processing unit (GPU), an random access memory (RAM), an read-only memory (ROM), and a first interface to an $n^{th}$ interface used for inputting/outputting.

In some embodiments, the display 260 includes a display panel configured to present a picture; a driving component configured to drive image displaying; a component configured to receive an image signal output from the controller to display a video content, an image content and a menu operation interface; UI for user operation and the like.

In some embodiments, the display 260 may be at least one of a liquid crystal display, an organic light-emitting diode (OLED), or a projection display, or may also be a projection device and a projection screen.

In some embodiments, the modem 210 receives a broadcast TV signal via a wired or wireless receiving mode and demodulates an audio-video signal from a plurality of wireless or wired broadcast television signals, for example, an EPG data signal.

In some embodiments, the communicator 220 is a component for communicating with an external device or a server according to various communication protocols. For example, the communicator may include at least one of a Wifi module, a Bluetooth module, a wired Ethernet module or other network communication protocol chips or near-field communication protocol chips, or an infrared receiver. The display apparatus 200 may establish communication of a control signal and a data signal with the control device 100 or the server 400 through the communicator 220.

In some embodiments, the detector 230 is configured to collect signals from the external environment or signals for interacting with the outside. For example, the detector 230 includes an optical receiver, and a sensor configured to collect environment light intensity signals; or the detector 230 includes an image collector, such as a camera, configured to collect external environment signals, a user attribute or a user interactive gesture; or the detector 230 includes a sound collector, such as a microphone, configured to receive external sounds.

In some embodiments, the external device interface 240 may include but not limited to: a high-definition multimedia interface (HDMI), an analog or data high-definition component input interface (component), a composite video broadcast signal (CVBS), a universal serial bus (USB) input interface, an RGB port or the like. It may also be a composite input/output interface formed by the plurality of above interfaces.

In some embodiments, the controller 250 and the modem 210 may be located in individual devices, that is, the modem 210 may also be located in an external device of a main device where the controller 250 is located, for example, an external set-top-box and the like.

In some embodiments, the controller 250 controls work of the display apparatus and responds to an operation from the user through various software programs stored in the memory. The controller 250 controls overall operation of the display apparatus 200. For example, in response to receiving a user command for selecting an object presented on a user interface on the display 260, the controller 250 may execute an operation related to the object selected by the user command.

In some embodiments, the object may be any one of optional objects, for example, a hyperlink, an icon or other controls which can be operated. The operation related to the selected object includes: operations such as displaying a page, a file and an image indicated by the hyperlink, or an operation for launching an application corresponding to the icon.

In some embodiments, the controller includes at least one of a CPU, a video processor, an audio processor, a GPU, a RAM, a ROM, a first interface to an $n^{th}$ interface used for inputting/outputting, a communication bus or the like.

The CPU is configured to run the operating system and application instructions stored in the memory, and run various applications, data and contents according to various interactive instructions from outside so as to finally display and play various audio-video contents. The CPU may include a plurality of processors, for example, including a main processor and one or more auxiliary processors.

In some embodiments, the graphics processing unit is configured to generate various graphic objects, for example, at least one of an icon, an operation menu, user input command display graphics or the like. The graphics processing unit includes an arithmetic unit which performs operations by receiving various interactive instructions from the user and display various objects according to a display attribute; and further includes a renderer which performs rendering on the various objects obtained based on the arithmetic unit; and the above rendered objects are used for being presented on the display.

In some embodiments, the video processor is configured to receive an external video signal and performs at least one of decompression, decoding, scaling, denoising, frame rate conversion, resolution conversion, image synthesis or other video processing according to a standard coding-decoding protocol of the input signal so as to obtain a signal which can be directly displayed or played on the display apparatus 200.

In some embodiments, the video processor includes at least one of a demultiplexing module, a video decoding module, an image synthesis module, a frame rate conversion module, a display formatting module or the like. The demultiplexing module is configured to perform demultiplexing processing on an input audio-video data stream. The video decoding module is configured to process a demultiplexed video signal, including decoding, scaling processing and the like. The image synthesis module such as an image synthesizer is configured to perform overlaying mixing processing on a graphic user interface (GUI) generated by a graphic generator and a video image for scaling processing so as to generate an image signal for display. The frame rate conversion module is configured to covert an input video frame rate. The display formatting module is configured to receive a video output signal for frame rate conversion and convert the signal to a signal suitable for a display format, for example, outputting an RGB data signal.

In some embodiments, the audio processor is configured to receive an external audio signal and performs at least one of decompression, decoding, denoising, digital-to-analogue conversion, amplification processing or other processing according to a standard coding-decoding protocol of the input signal so as to obtain a sound signal for being played in a speaker.

In some embodiments, the user may input a command on GUI displayed on the display 260, and then the user input interface receives the command from the user through the GUI. Or, the user may input a command by inputting a specific voice or gesture, and then the user input interface recognizes the voice or the gesture through the sensor so as to receive the command from the user.

In some embodiments, "user interface" is an interface for interaction and information exchange between an application or an operating system of the display apparatus and a user, which realizes conversion between an internal form of information and a form which can be accepted by the user. A common presentation form of the user interface is the GUI, which is a user interface presented on a graphic form and related to computer operation. The user interface may comprise at least one of an icon, a window, a control and other elements presented on a display screen of an electronic device; where the control may include an icon, a button, a menu, a tab, a textbox, a dialog box, a status bar, a navigation bar, a Widget or other visible elements.

In some embodiments, the user input interface 280 is an interface used for receiving control input (for example, a physical key or others on a body of the display apparatus).

In some embodiments, a system of the display apparatus may include a kernel, a command parser (shell), a file system and one or more applications. The kernel, the shell and the file system form a basic structure of the operating system and enable the user to manage a file, run programs and use the system. When powered on, the kernel is started, a kernel space is activated, hardware is abstracted, hardware parameters are initialized, a virtual memory, a scheduler, a signal and interprocess communication (IPC) are run and maintained. After the kernel is started, the shell and a user application are loaded. The application, after being started, is compiled to machine codes to create a process.

Figure 4:
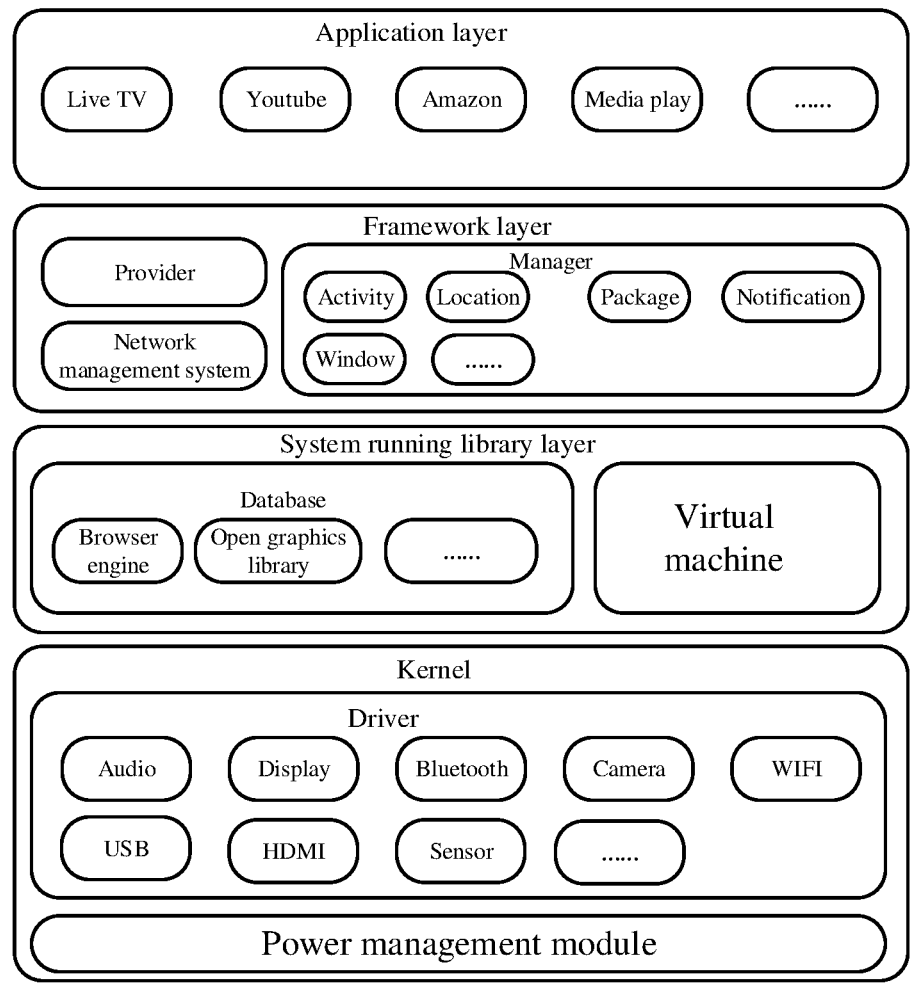
FIG. 4 shows a schematic diagram of software configuration in a display apparatus 200 according to some embodiments.

Referring to FIG. 4, in some embodiments, the system is divided into four layers, which are an application layer, an application framework layer ("framework layer" for short), an Android runtime and system library layer (system run library layer), and a kernel layer from top to bottom.

In some embodiments, at least one application is run in the application layer, and these applications may be a window application, a system set program or a clock application and the like carried in the operating system; or may be an application developed by a third party developer. During specific implementations, the applications in the application layer include but not limited to the above examples.

The framework layer provides an application programming interface (API) and a programming framework for the applications in the application layer. The application framework layer includes some predefined functions. The application framework layer functions like a processing center, which causes applications in the application layer to take an action. The applications may access resources in the system and obtain services of the system through API interfaces.

As shown in FIG. 4, the application framework layer in the embodiments of the disclosure includes managers, a content provider and the like, the managers include at least one of the following modules: an activity manager configured to interact with all activities which are running in the system; a location manager configured to provide an access for a system service or application; a package manager configured to retrieve various information related to an application package installed on the apparatus; a notification manager configured to control displaying and removing of a notification message; and a window manager configured to manage an icon, a window, a tool bar, a wallpaper and desktop components on the user interface.

In some embodiments, the activity manager is configured to manage a life cycle and a usual navigation back function of each application, for example, exit, open, back and the like of an application. The window manager is configured to manage all window programs, for example, obtaining a size of a display screen, determine whether there is a status bar, locking a screen, screen capturing, controlling presentation form change of a display window (for example, the display window is scaled down, shaken, distorted and the like) and the like.

In some embodiments, the system running library layer provides support for an upper layer, namely the framework layer, and when the framework layer is used, the Android operating system may run a C/C++ library contained in the system running library layer so as to realize functions implemented by the framework layer.

In some embodiments, the kernel layer is a layer between hardware and software. As shown in FIG. 4, the kernel layer at least includes at least one of the following drivers: an audio driver, a display driver, a Bluetooth driver, a camera driver, a WIFI driver, a USB driver, an HDMI driver, a sensor driver (for example, a fingerprint sensor, a temperature sensor, a pressure sensor and the like), a power driver and the like.

Figure 5:
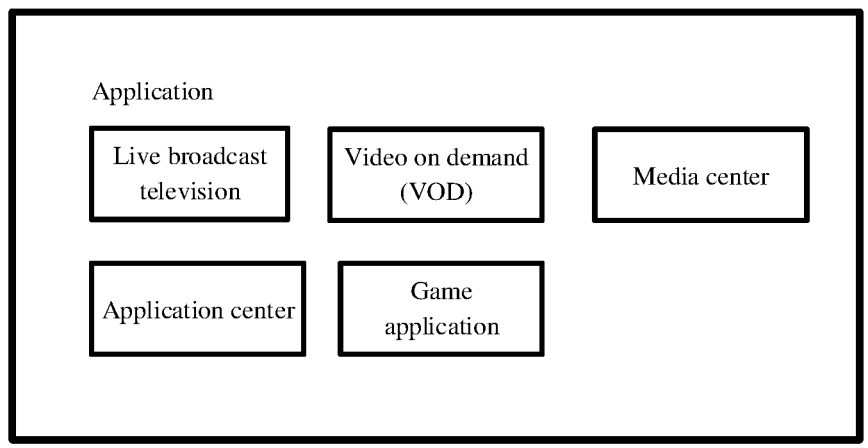
FIG. 5 shows a schematic diagram of displaying of an icon interface of an application in a display apparatus 200 according to some embodiments.

FIG. 5 shows a schematic diagram of an icon interface of an application in the display apparatus 200 according to some embodiments. In some embodiments, as shown in FIG. 5, the application layer includes at least one application whose corresponding icon can be presented on the display, for example, a live broadcast television application icon, a video-on-demand application icon, a media center application icon, an application center icon, a game application icon and the like.

In some embodiments, a live broadcast television application may provide a live broadcast television application through different signal sources. For example, the live broadcast television application may provide television signals by using an input from a cable television, a radio broadcast, a satellite broadcast or other types of live broadcast television services. The live broadcast television application may display a video from the live broadcast television signals on the display apparatus 200.

In some embodiments, a video-on-demand application may provide a video from different storage sources. The video-on-demand application, different from the live broadcast television application, provides video from some storage sources. For example, the video on demand may come from cloud storage on a server and from a local hard disk memory with saved video programs.

In some embodiments, the media center application may provide applications for playing various media contents. For example, a media center may be different from a live broadcast television or a video on demand, and the user may access services provided by various images or audios through the media center application.

In some embodiments, an application center may provide and store various applications. The applications may be a game application, or some other applications related to a computer system or other devices and which can be run on a smart television. The application center may obtain these applications from different sources, store them in a local memory and then run them on the display apparatus 200.

In some embodiments, when a digital television function is realized by using the display apparatus, supported television channels or television programs may be presented in the display apparatus usually by using an electronic program guide (EPG) page. Because the display apparatus supports many television programs, the television programs are usually presented together by using multiple EPG pages. For example, television programs in next 7 days may be usually displayed on the multiple EPG pages of the display apparatus, channels corresponding to a certain broadcast time period is presented on each EPG page, and each channel has a plurality of pieces of program information.

A region for program information may be displayed on each EPG page and is used for displaying a particular broadcast time period and some program information from a plurality of channels in this particular time period, and a piece of program information is UI display data corresponding to a television program for display, for example, CCTV1, CCTV2, CCTV5, and the like. The multiple pieces of program information corresponding to the plurality of channels presented on the program information region on a certain EPG page may be regarded as a program list of that particular broadcast time period.

Each piece of program information may obtain a focus on the EPG interface. When a certain piece of program information on a certain channel is selected for play, the focus may be controlled to move on each piece of program information, and a confirmation key on a remote control is selected to check detailed information of current program information where the focus is located. Besides, operations such as schedule watch and schedule recording may be performed on each piece of program information presented on the EPG page.

For example, when a user intends to watch program A in a future broadcast time period TA, but in the time period TA, the user cannot watch due to work or other reasons, the program A corresponding to the broadcast time period TA may be automatically recorded by the display apparatus by calling a schedule recording function configured in the display apparatus. When the user intends to watch program B in a future broadcast time period TB but is afraid that he or she may forget to watch the program, the user may be reminded to watch before the broadcast time period TB of the program B through the display apparatus by calling a schedule watching function configured in the display apparatus.

After some programs are scheduled, in order to facilitate checking for the user, identifiers may be displayed on the corresponding programs, for example, an identifier for indicating schedule of a program. For example, an alarm identifier is displayed for a scheduled program, a camera identifier is displayed for a program scheduled to record, and the identifiers in the above examples serve as schedule identifiers to indicate that the programs are already scheduled. Time periods and channels corresponding to the scheduled programs can form a schedule list.

A plurality of channels are presented in each EPG page and correspond to multiple pieces of program information, and when a certain piece of program information on a certain EPG page is scheduled, an identifier for the scheduled program needs to be displayed for the program information. When there is a new program which has been scheduled, whether program information of that new program exists in the schedule list or not may be determined firstly, and if the program information of that new program does not exist in the schedule list, a program schedule identifier is displayed for the program information.

When an EPG page is loaded, in order to determine whether a program schedule identifier needs to be displayed on the EPG page, in an existing method, each piece of program information on the EPG page is compared with the schedule list, a calculation amount is large, displaying of the program schedule identifier is slow, a loading speed of the EPG page is affected, and user experience is affected.

In order to conveniently and rapidly display the program schedule identifier, a display apparatus according to embodiments of the disclosure performs calculation of program schedule identifiers merely specific to program information which has a schedule conflict with the schedule list, so that a large quantity of calculation processes can be omitted. The display apparatus includes: a display and a controller. The display is configured to display an EPG page, and a broadcast time period, channels and program information are presented on the EPG page. The controller is connected with the display and configured to execute a method for rapidly displaying a program schedule identifier.

Figure 6:
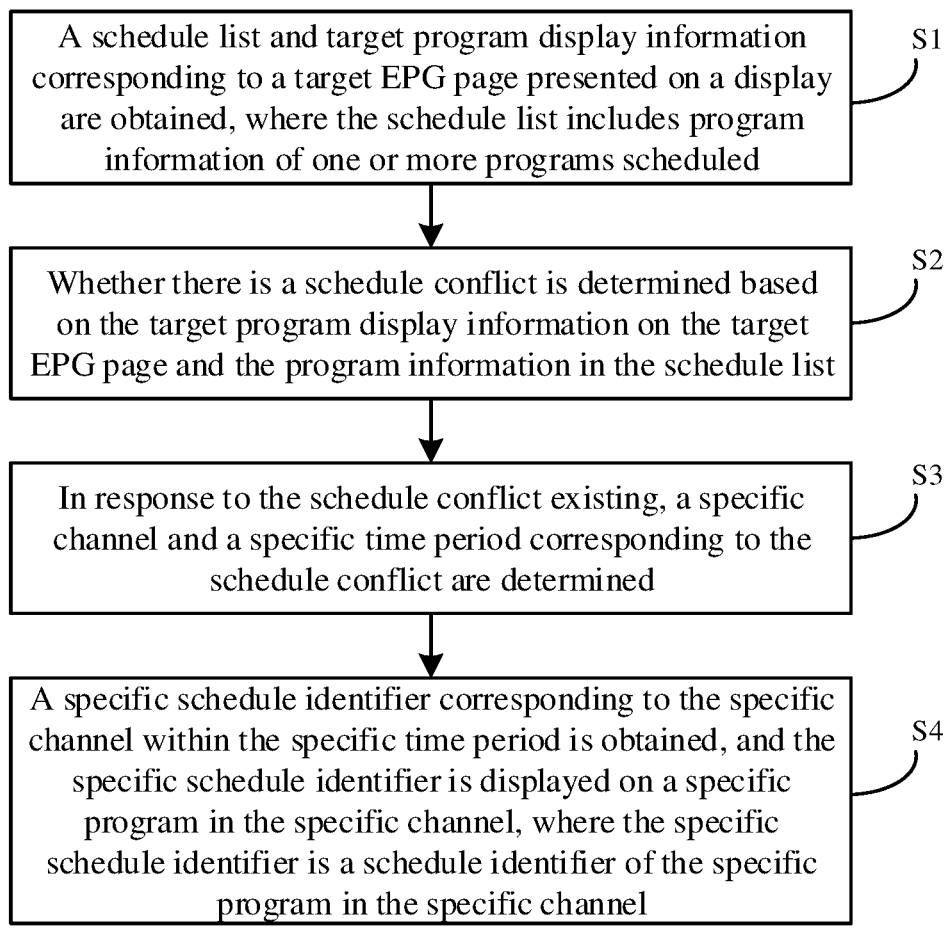
FIG. 6 shows a flowchart of a method for rapidly displaying a program schedule identifier according to some embodiments.
Figure 7:
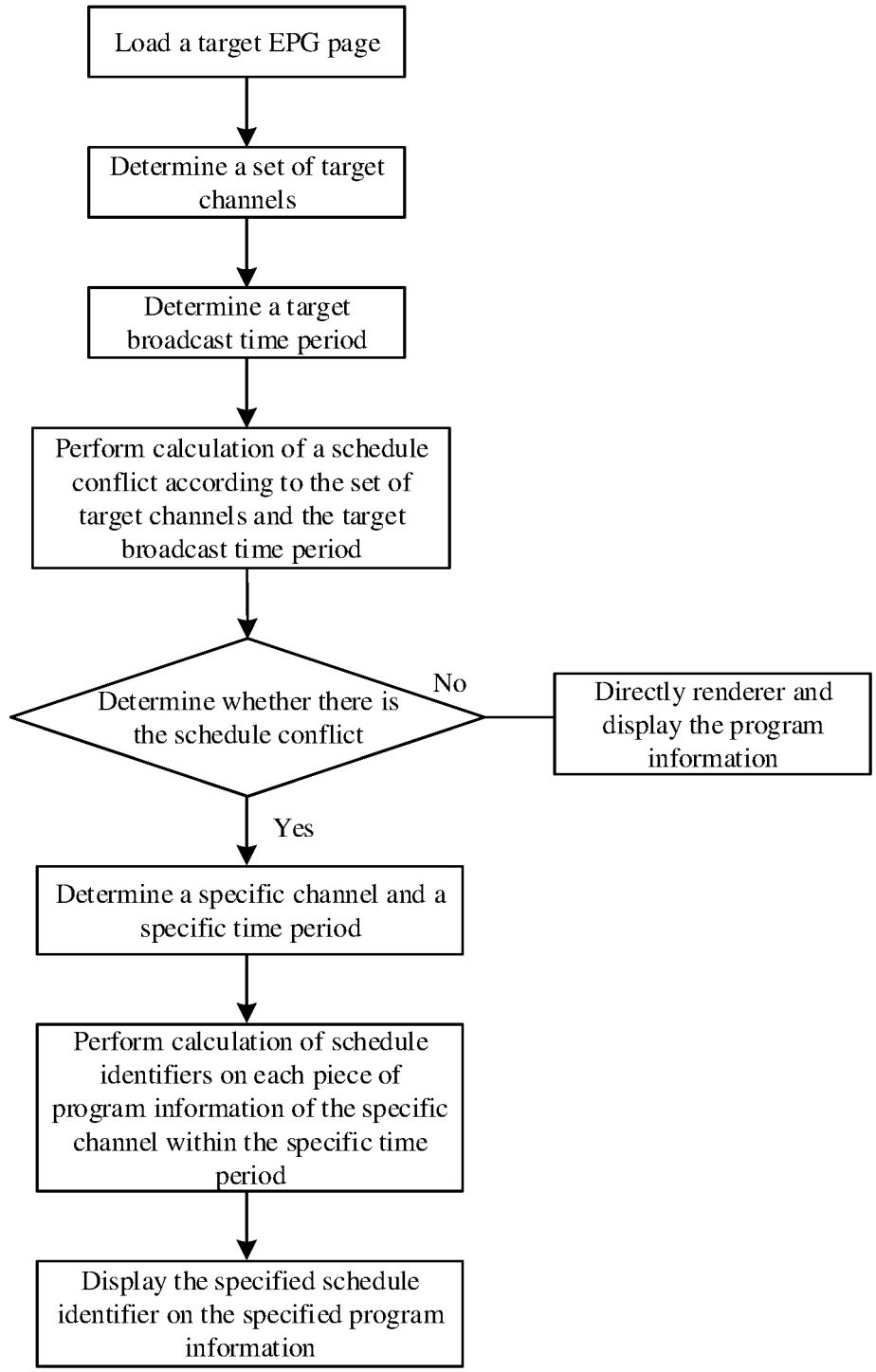
FIG. 7 shows a flowchart of a method for rapidly displaying a program schedule identifier according to some embodiments.

FIG. 6 shows a flowchart of a method for rapidly displaying a program schedule identifier according to some embodiments. FIG. 7 shows a flowchart of a method for rapidly displaying a program schedule identifier according to some embodiments. Referring to FIG. 6 and FIG. 7, in the display apparatus according to the embodiments of the disclosure, when the method for rapidly displaying the program schedule identifier is executed, a controller is configured to execute the following steps.

S1, a schedule list and target program display information corresponding to a target EPG page presented on a display are obtained, where the schedule list includes program information of one or more programs scheduled.

When entering an EPG page or turning an EPG page via a remote control, that is, an EPG page loading process is executed once. The display only displays one of the EPG pages, namely, a target EPG page at one time, and does not display all the EPG pages at the same time. As there are many channels configured in the display apparatus, a displaying degree of each EPG page is limited, so each EPG page displays merely a part of channels but not display all the channels at the same time. At the same time, each EPG page does not display all time periods but merely display a display time length corresponding to the broadcast time period so that a certain EPG page presented on the display can clearly display a plurality of pieces of program information in each time period from each channel. In other words, the target EPG page corresponds to a target program list.

A broadcast time period, channels and program information are presented on each EPG page to serve as program display information. In some embodiments, a display time length corresponding to a broadcast time period of each EPG page may be set to be two hours, or may be set to be other values according to actual needs, which is not specifically limited.

Figure 8:
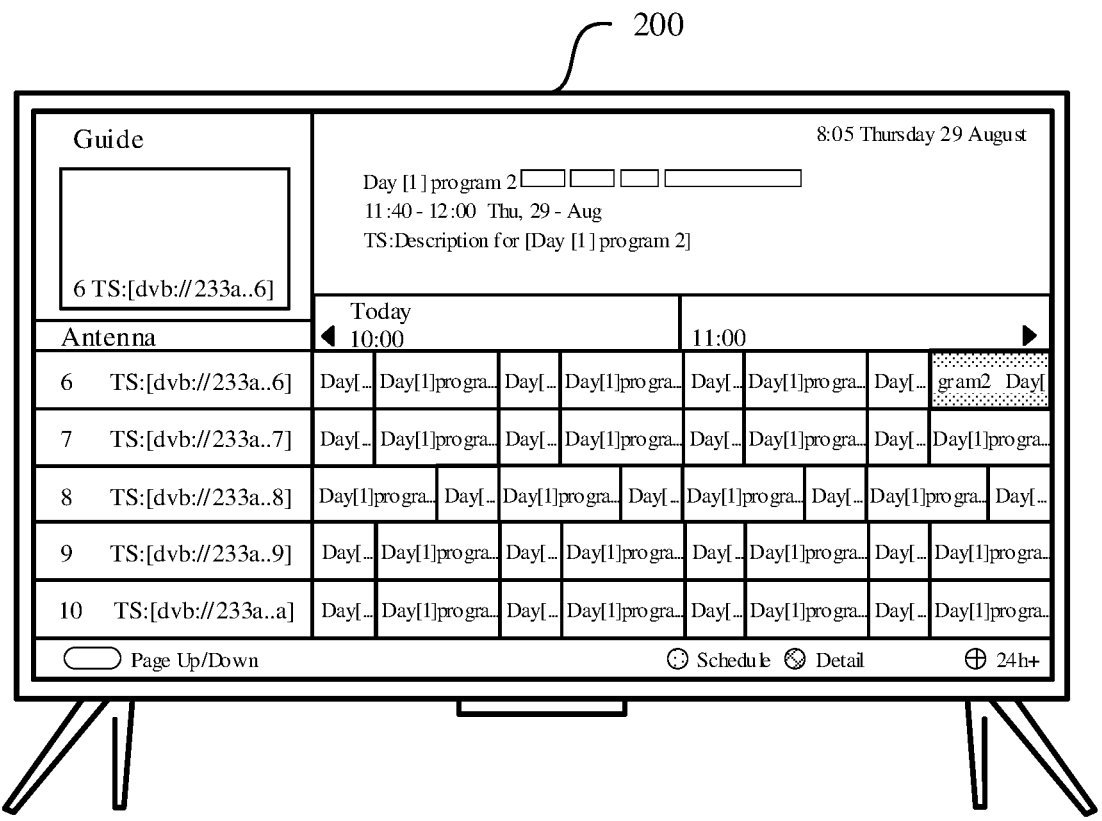
FIG. 8 shows a schematic diagram of an EPG page according to some embodiments.

FIG. 8 shows a schematic diagram of an EPG page according to some embodiments. For example, when a certain EPG page is loaded, a broadcast time period on the EPG page is 10:00~12:00, displayed time values are 10:00 and 11:00, which means starting time of two time lengths corresponding to 10:00~12:00, that is, the starting time 10:00 corresponds to the time length of 10:00~11:00, and the starting time 11:00 corresponds to the time length of 11:00~12:00. Channels are channel 6 (TS[DVB://233A.6]) to channel 10 (TS[DVB://233A.10]), and the plurality of pieces of program information are information of television programs which broadcast in the time range of 10:00~12:00 from channel 6 to channel 10.

When entering the EPG page or turning an EPG page, in order to conveniently calculate whether there is a program schedule identifier for being displayed on the EPG page, the controller needs to firstly obtain the schedule list and target program display information corresponding to the target EPG page presented on the display.

The program information of one or more scheduled programs is stored in the schedule list, that is, one or more schedule time intervals corresponding to one or more scheduled programs and a set of channels and program information of the one or more schedule time intervals are stored. The target program display information includes a target broadcast time period, a set of target channels in the target broadcast time period and a plurality of pieces of program information corresponding to the set of target channels presented on the target EPG page. The set of target channels includes a plurality of target channels, namely, a plurality of target channels corresponding to the target EPG page displayed currently. For example, the channels 6 to 10 shown in FIG. 8 are a set of target channels. Each target channel corresponds to a plurality of pieces of program information on the target broadcast time period.

S2, whether there is a schedule conflict is determined based on the target program display information on the target EPG page and the program information in the schedule list.

When the target EPG page is loaded, in order to conveniently and accurately determine whether a schedule identifier needs to be displayed on the target EPG page, and perform calculation and displaying rapidly, and avoiding performing calculation of the schedule identifier for each piece of program information on the target EPG page, in some embodiments, whether the target program display information presented on the target EPG page has a schedule conflict with program information on the schedule list may be determined firstly.

When the target EPG page is loaded, a target broadcast time period corresponding to the target EPG page may be determined. To determine whether there is a schedule identifier for being presented on the target broadcast time period, whether a newly scheduled program and a previously scheduled program in the schedule list have a schedule conflict in the target broadcast time period may be determined, and when the schedule conflict occurs, it means that a schedule identifier is needed to be displayed.

The schedule conflict means that when a new program schedule is made for recording or watching in a certain time period, there is another prior schedule within that certain time period; and when there is an overlap between the new program schedule and a prior program schedule in the certain time period, it indicates that the schedule conflict occurs. For example, when a program CCTV1 scheduled to be recorded at 8:00~8:30 tomorrow is already stored in the schedule list, but a user configures a new recording schedule for the program CCTV2 at 8:10~8:50 tomorrow, the new schedule time period and the prior schedule time period have an overlap time period 8:10~8:30, that is, a schedule conflict happens.

Whether there is a schedule conflict between a program list on the target EPG page and the schedule list stored is determined based on the target program display information on the target EPG page and the scheduled program information in the schedule list, where the target program display information includes a target broadcast time period and a set of target channels, and the scheduled program information includes a target schedule time interval and a set of target schedule channels. Therefore, whether there is a schedule conflict is determined according to the target broadcast time period and the set of target channels on the target EPG page, and the target schedule time interval and the set of target schedule channels in the schedule list.

Figure 9:
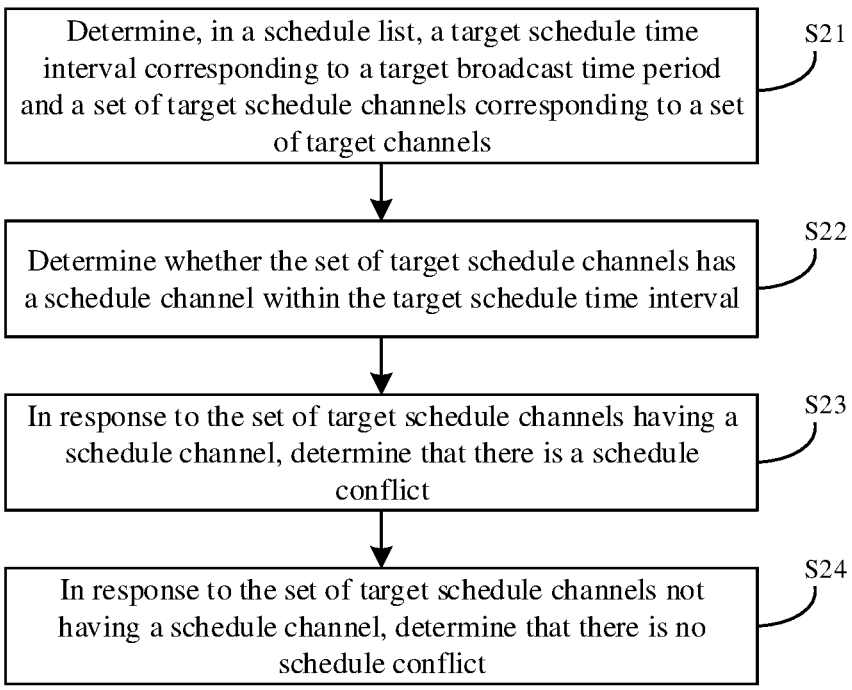
FIG. 9 shows a flowchart of a method for determining whether there is a schedule conflict according to some embodiments.

FIG. 9 shows a flowchart of a method for determining whether there is a schedule conflict according to some embodiments. Referring to FIG. 9, when determining whether there is a schedule conflict based on the target program display information on the target EPG page and the scheduled program information in the schedule list, the controller is further configured to:

S21, determine, in a schedule list, a target schedule time interval corresponding to a target broadcast time period on a target EPG page and a set of target schedule channels corresponding to a set of target channels on the target EPG page;

S22, determine whether the set of target schedule channels has a schedule channel within the target schedule time interval;

S23, in response to the set of target schedule channels having a schedule channel within the target schedule time interval, determine that there is a schedule conflict; and S24, in response to the set of target schedule channels not having a schedule channel within the target schedule time interval, determine that there is no schedule conflict.

When the target program list presented on the target EPG page is compared with the schedule list, a comparison time period of the schedule list is the same as a time period corresponding to the target program list, and thus, a target schedule time period in the schedule list can be determined based on the target broadcast time period for the target program list. For example, if the target broadcast time period for the target program list presented on the target EPG page is 10:00~12:00, the target schedule time period in the schedule list is also 10:00~12:00.

At the same time, when determining the schedule conflict, merely the target channels presented on the target EPG page are compared, that is, program channels for comparison in the target program list and scheduled program channels for comparison in the schedule list are the same. Therefore, the set of target schedule channels in the schedule list may be determined based on the set of target channels for the target program list presented on the target EPG page. For example, if the set of target channels for the target program list presented on the target EPG page is the channels 6 to 10, the set of target schedule channels in the schedule list is also the channels 6 to 10.

After determining the set of target schedule channels for schedule conflict determination, whether the set of target schedule channels in the schedule list has a schedule channel within the target schedule time interval is determined. The schedule channel is a channel where a program has been scheduled by a user. When there is a scheduled channel, that is, there is a scheduled channel in the set of target schedule channels, it is determined that the schedule conflict exists; and when there is no scheduled channel, that is, there is no scheduled channel in the set of target schedule channels, it is determined that there is no schedule conflict.

Whether there is the schedule channel in the set of target schedule channels is determined based on whether a schedule time interval corresponding to each schedule channel and the target broadcast time period have a time overlap.

In some embodiments, when executing step S22, that is, determining whether the set of target schedule channels in the schedule list has a schedule channel within the target schedule time interval, the controller is further configured to execute the following steps.

Step 221, one or more program broadcast time periods corresponding to the set of target channels within the target broadcast time period are obtained.

Step 222, whether there is a time period having a time overlap with any one of the one or more program broadcast time periods within the target schedule time interval is determined.

Step 223, if there is a time period having a time overlap within the target schedule time interval, it is determined that the set of target schedule channels has the schedule channel.

Step 224, if there is no time period having a time overlap within the target schedule time interval, it is determined that the set of target schedule channels has no schedule channel.

There are a plurality of target channels in the target broadcast time period on the target EPG page, each target channel has one or more programs each with a piece of program information, and each piece of program information corresponds to a program broadcast time period, so that the set of target channels corresponds to a plurality of program broadcast time periods, The program broadcast time period for a program is a time period when this program is broadcast, which includes a starting time and an end time.

For example, in the target broadcast time period 10:00~12:00 on the target EPG page, the set of target channels is the channels 6 to 10. The channel 6 includes: program information A61 which corresponds to the program broadcast time period 10:10~10:30, program information A62 which corresponds to the program broadcast time period 10:35~10:50, and program information A63 which corresponds to the program broadcast time period 11:00~11:50. The channel 7 includes: program information A71 which corresponds to the program broadcast time period 10:00~10:25, program information A72 which corresponds to the program broadcast time period 10:30~10:50, program information A73 which corresponds to the program broadcast time period 11:00~11:20; and program information A74 which corresponds to the program broadcast time period 11:25~11:59. Likewise, the channel 10 includes: program information A101 which corresponds to the program broadcast time period 10:00~10:45, program information A102 which corresponds to the program broadcast time period 10:50~11:20, and program information A103 which corresponds to the program broadcast time period 11:25~11:59.

Since the set of channels and time periods in the schedule list and the set of channels and time periods in the target program list of the target EPG page are the same, and therefore whether there is a time period having a time overlap with any one of the program broadcast time periods within the target schedule time interval in the schedule list may be determined, so as to determine whether there is a schedule channel in the set of target schedule channels. When there is a time period overlapping with any one of the above program broadcast time periods within the target schedule time interval, it indicates that a program is already scheduled on a certain channel, then it is determined that there is a schedule channel in the set of target schedule channels, and thus it is determined that there is a schedule conflict. When there is no time period overlapping with any one of the above program broadcast time periods within the target schedule time interval, it indicates that no program is already scheduled on any one of channels, then it is determined that there is no schedule channel in the set of target schedule channels, and thus it is determined that there is no schedule conflict.

When there is a schedule conflict, it indicates that there is the channel that has a previously scheduled program on the target EPG page, that is, a schedule identifier needs to be displayed on this channel.

S3, in response to the schedule conflict existing, a specific channel and a specific time period corresponding to the schedule conflict are determined.

The schedule list and a program list on a certain EPG page belong to different business modules, and have different data structures, which are usually stored respectively. The schedule list is a dynamic list, and the program list is also a list generated by a certain EPG page displayed currently on the display which is obtained from a bit stream in real time, so that direct data bonding of the schedule list and the program list cannot be performed. In other words, when it is determined that there is a schedule conflict, specific program information having the schedule conflict cannot be directly obtained; and instead, the specific channel and the specific time period with the schedule conflict are obtained.

When the target program list on the target EPG page and the schedule list have a schedule conflict, the specific channel and the specific time period with the schedule conflict can be determined. The specific channel is a channel having time overlap; and the specific time period is a whole time period formed by at least one time period in which the specific channel has the time overlap, but not a specific time period corresponding to a certain program.

Figure 10:
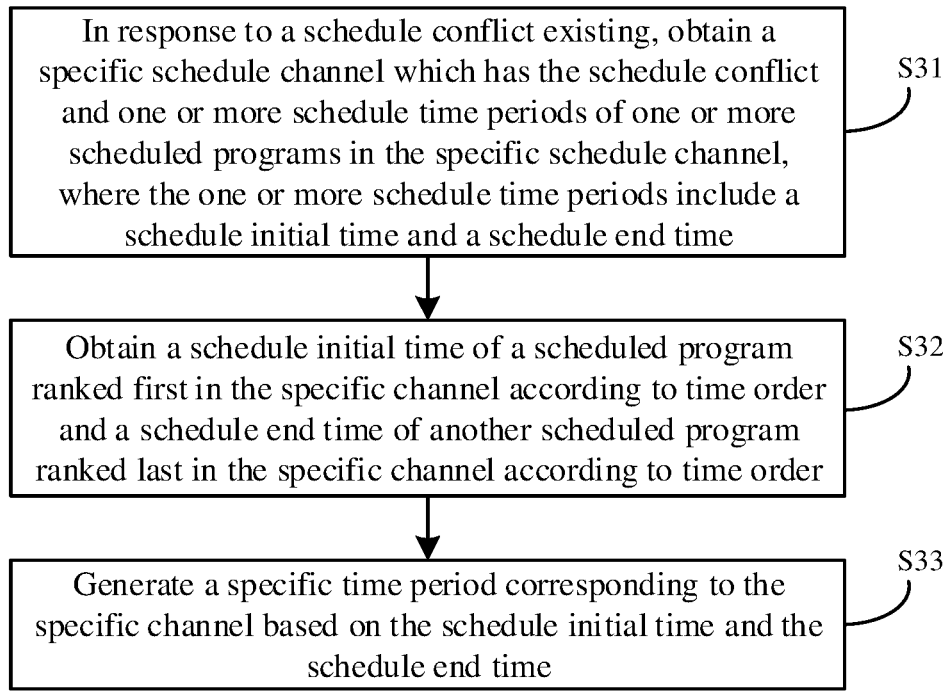
FIG. 10 shows a flowchart of a method for determining a specific channel and a specific time period according to some embodiments.

FIG. 10 shows a flowchart of a method for determining a specific channel and a specific time period according to some embodiments. Referring to FIG. 10, in some embodiments, when the controller executes that if there is a schedule conflict, a specific channel and a specific time period with the schedule conflict are determined, the controller is further configured to:

S31, in response to a schedule conflict existing, obtain a specific schedule channel which has the schedule conflict and one or more schedule time periods of one or more scheduled programs in the specific schedule channel, where the one or more schedule time periods include a schedule initial time and a schedule end time;

S32, obtain a schedule initial time of a scheduled program ranked first in the specific channel according to time order and a schedule end time of another scheduled program ranked last in the specific channel according to time order; and S33, generate a specific time period corresponding to the specific channel based on the schedule initial time and the schedule end time.

As one channel has multiple programs, several programs may be scheduled in advance. In other words, on the same channel, there may be several programs which have time overlaps with the target broadcast time period, that is, several scheduled programs.

When the schedule conflict occurs, it is determined that there is one time period which overlaps with any one of the program broadcast time periods within the target schedule time interval, and it indicates that a program is already scheduled on a certain channel, so the channel with a scheduled program in the set of target schedule channels is determined as a specific channel.

When determining a specific time period of the specific channel, the schedule time of each scheduled program which has overlap with the target broadcast period on the specific channel may be determined first namely, the schedule initial time and the schedule end time. If a plurality of programs have time overlaps on the specific channel, namely, overlapping time periods of the plurality of scheduled programs may be discontinuous, and the schedule time of the plurality of scheduled programs which have the overlapping time periods are combined, thus forming a complete continuous time period.

When the schedule time of the plurality of scheduled programs which have the overlapping time periods are combined, the schedule initial time of the scheduled program ranked first in the one or more scheduled programs is used as a starting time, the schedule end time of the scheduled program ranked last in the one or more scheduled programs is used as an end time, and the starting time and the end time are combined to generate the complete continuous time period, namely, the specific time period. If the specific channel has merely one scheduled program, the schedule time of the scheduled program is the specific time period for the specific channel.

Figure 11:
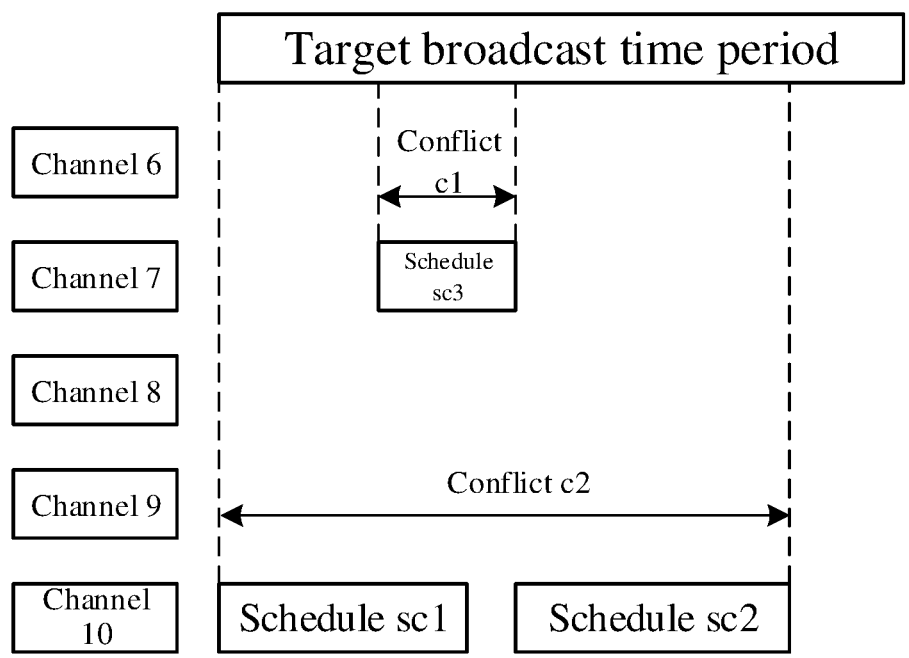
FIG. 11 shows a schematic diagram for determining a specific time period according to some embodiments.

FIG. 11 shows a schematic diagram of determining a specific time period according to some embodiments. Referring to FIG. 11, the specific channels having schedule conflicts are channel 7 and channel 10. There is a piece of schedule program information (schedule sc3) on the channel 7 where a conflict c1 exists, whose schedule time is 10:30~10:50; and there are two pieces of schedule program information (schedule sc1 and schedule sc2) on the channel 10 where a conflict c2 exists, whose schedule time are 10:00~10:45 and 10:50~11:20 respectively.

Because there is merely one piece of schedule program information on the channel 7, the starting time of the specific time period corresponding to the channel 7 is the schedule initial time 10:30 of the scheduled program, the end time is the schedule end time 10:50 of the scheduled program, and therefore the specific time period of the channel 7 is 10:30~10:50.

The channel 10 has two pieces of schedule program information, the starting time of the specific time period corresponding to the channel 10 is the schedule initial time 10:00 of the first scheduled program (schedule sc1), the end time of the specific time period corresponding to the channel 10 is the schedule end time 11:20 of a second scheduled program (schedule sc2), and therefore the specific time period of the channel 10 is 10:00~11:20.

After the specific channel and the specific program time period are determined, calculation for schedule identifiers may be performed merely specific to scheduled programs from the specific channel on the target EPG page within the specific program time period, so that the program which needs to be displayed with a schedule identifier is rapidly determined.

S4, a specific schedule identifier corresponding to the specific channel within the specific time period is obtained, and the specific schedule identifier is displayed on a specific program in the specific channel, where the specific schedule identifier is a schedule identifier of the specific program in the specific channel.

During program rendering and displaying, calculation of the schedule identifiers is performed merely on scheduled programs of the specific channel where the schedule conflict has occurred within the specific time period. The one or more specific programs which are each displayed with a schedule identifier on the specific channel within the specific time period are determined, and a specific schedule identifier is displayed on a corresponding specific program so as to indicate that the corresponding specific program has been scheduled.

Figure 12:
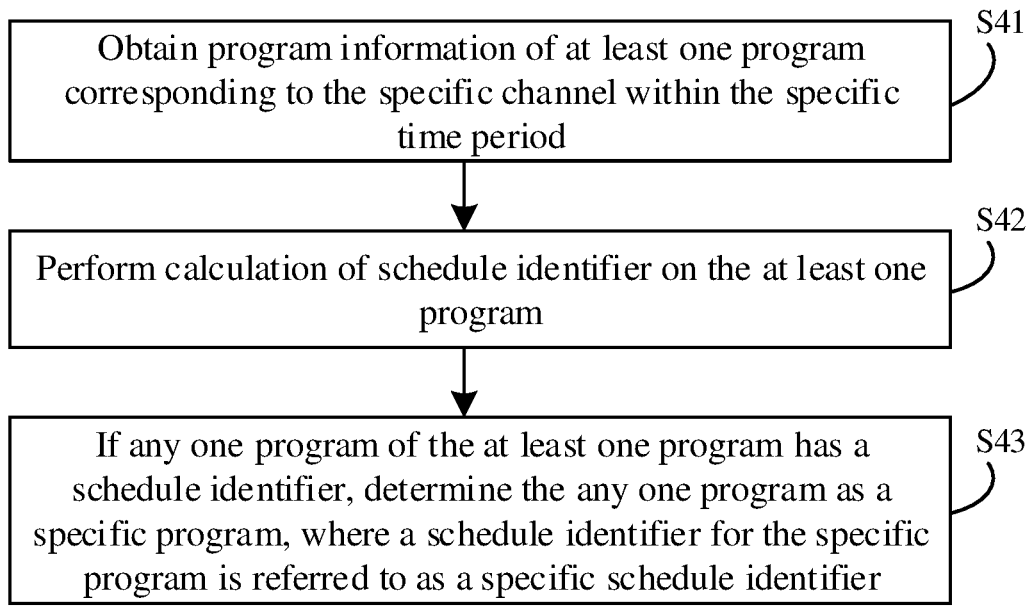
FIG. 12 shows a flowchart of a method for determining a specific schedule identifier according to some embodiments.

FIG. 12 shows a flowchart of a method for determining a specific schedule identifier according to some embodiments. Referring to FIG. 12, in some embodiments, when obtaining the specific schedule identifier corresponding to the specific channel within the specific time period, the controller is further configured to:

S41, obtain program information of at least one program corresponding to the specific channel within the specific time period;

S42, perform calculation of schedule identifier on the at least one program; and S43, if any one program of the at least one program has a schedule identifier, determine the any one program as a specific program, where a schedule identifier for the specific program is referred to as a specific schedule identifier.

The specific channel has a plurality of programs each with a piece of program information; and within the specific time period, there may be one or more programs. The one or more programs include at least one scheduled program and at least one non-scheduled program.

Therefore, for conveniently and accurately determining which program(s) needs to be displayed with a schedule identifier in a specific channel, calculation of schedule identifier is performed on each program in the specific channel having a schedule conflict within a specific time period, so as to determine the schedule identifier for being displayed. The calculation can adopt an existing GC algorithm and is not specifically limited here.

If a calculation result indicates that a program has a schedule identifier, the program with the schedule identifier is referred to as a specific program, where the schedule identifier of the specific program is a specific schedule identifier. Then, program rendering is performed, that is, the specific schedule identifier is displayed on the specific program on the specific channel. The schedule identifiers may include an identifier for indicating program schedule recording and an identifier for indicating program schedule watching, etc.

Therefore, when the calculation of the schedule identifiers is performed, calculation is performed merely specific to programs in the specific channel having the schedule conflict, calculation of the schedule identifiers is not performed on programs on other channels not having a schedule conflict, and rendering is directly performed when the EPG page is loaded, that is, the target broadcast time period and each target program corresponding to the target channel are directly displayed.

It can be seen from the above technical solution that in the display apparatus provided by the embodiments of the disclosure, the controller is configured to determine, based on the schedule list and the target program display information corresponding to a target EPG page presented on the display, whether there is the schedule conflict; determine a specific channel and a specific time period corresponding to the schedule conflict in response to the schedule conflict existing; and obtain a specific schedule identifier corresponding to the specific channel within the specific time period, and display the specific schedule identifier on a specific program corresponding to the specific channel. Therefore, in the display apparatus provided by the embodiments of the disclosure, when the EPG page is loaded, whether there is a schedule conflict with the schedule list is determined in advance, calculation of the schedule identifiers is performed merely specific to program(s) on the specific channel having the schedule conflict, and calculation of the schedule identifiers is not performed on programs in other channels not having a schedule conflict, so that a large amount of calculation for the schedule identifiers can be omitted, and rapid displaying of the schedule identifiers is realized.

FIG. 6 shows a flowchart of a method for rapidly displaying a program schedule identifier according to some embodiments. Referring to FIG. 6, the application further provides a method for rapidly displaying a program schedule identifier, which is executed by a controller configured in the display apparatus provided by the above embodiments. The method includes:

S1, obtaining a schedule list and target program display information corresponding to a target EPG page presented on a display, where the schedule list includes program information of one or more scheduled programs;

S2, determining whether there is a schedule conflict based on the target program display information on the target EPG page and the program information in the schedule list;

S3, in response to the schedule conflict existing, determining a specific channel and a specific time period corresponding to the schedule conflict; and S4, obtaining a specific schedule identifier corresponding to the specific channel within the specific time period, and displaying a specific schedule identifier on a specific program in the specific channel, where the specific schedule identifier is a schedule identifier of the specific program in the specific channel.

In some embodiments, the target program display information includes a target broadcast time period and a set of target channels, the program information of one or more scheduled programs includes one or more target schedule time intervals and a set of target schedule channels. Determining whether there is a schedule conflict based on the target program display information on the target EPG page and the program information in the schedule list, includes: determining, in the schedule list, a target schedule time interval corresponding to the target broadcast time period and a set of target schedule channels corresponding to the set of target channels; determining whether the set of target schedule channels in the schedule list has a schedule channel within the target schedule time interval; determining that there is a schedule conflict when the set of target schedule channels has the schedule channel; and determining that there is no schedule conflict when the set of target schedule channels has no schedule channel.

In some embodiments, determining whether the set of target schedule channels in the schedule list has a schedule channel within a target schedule time interval includes:

obtaining a plurality of program broadcast time periods corresponding to the set of target channels within the target broadcast time period; determining whether there is a time period having time overlapping with any one of the plurality of program broadcast time periods within the target schedule time interval; determining that the set of target schedule channels has the schedule channel when there is a time period having time overlapping within the target schedule time interval; and determining that the target schedule channel set has no schedule channel when there is no time period having time overlapping within the target schedule time interval.

In some embodiments of the disclosure, the determining a specific channel and a specific time period corresponding to the schedule conflict includes: obtaining a specific channel corresponding to the schedule conflict and schedule time of at least one scheduled program in the specific channel, where the schedule time includes a schedule initial time and a schedule end time; obtaining a schedule initial time of a scheduled program ranked first in time order and a schedule end time of a scheduled program ranked last in time order in the specific channel; and generating the specific time period corresponding to the specific channel based on the schedule initial time and the schedule end time.

In some embodiments of the disclosure, the obtaining a specific schedule identifier corresponding to the specific channel within the specific time period includes: obtaining at least one program in the specific channel within the specific time period; performing calculation of schedule identifier on each of the at least one program; and if any one program of the at least one program has a schedule identifier, determining the any one program as a specific program, where the schedule identifier of the specific program is a specific schedule identifier.

In a specific implementation, the disclosure further provides a computer storage medium. The computer storage medium may store programs. When the programs are executed, a part or all of steps in various embodiments of the method for rapidly displaying a program schedule identifier provided by the disclosure are executed. The storage medium may be a diskette, an optical disc, a read-only memory (ROM) or a random access memory (RAM) and the like.

Because the display apparatus may support many television programs, if a user intends to check a television program in more than ten hours, a few days ago or a few days later, the user needs to search for a television program corresponding to the target broadcast time period in a program information region of each EPG page, that is, the user needs to move the focus one by one to turn pages till reaching the target broadcast time period and needs to execute a page turning action to continue to search after moving the focus to a boundary of the program information region of the current EPG page. Therefore, the user needs to move the focus frequently and turns pages repeatedly to check television programs in the target broadcast time period, program information presented on the corresponding program information region needs to be obtained in bit streams every time the focus skips to a new EPG page, consequently, operation time is long, and user experience is poor.

In order to enable the user to rapidly check a television program in the target broadcast time period among a plurality of pieces of program information presented on the plurality of EPG pages, an embodiment of the disclosure provides a display apparatus, including: a display, a remote control and a controller which is capable of realizing rapid page turning. The display is configured to present an EPG page where a program information region is displayed, where a corresponding broadcast time period and a plurality of pieces of program information are displayed on the program information region of each EPG page.

In some embodiments, a display time duration corresponding to a broadcast time period of each EPG page may be set to be two hours, or may be set to be other values according to needs, which is not specifically limited. For example, a broadcast time period is 8:00~10:00, and displayed time numerical values are 8:00 and 9:00, which indicates starting time points of two time durations corresponding to 8:00~10:00 (not including 10:00), that is, the starting time 8:00 indicates the time duration 8:00~9:00 (not including 9:00), and the starting time 9:00 indicates the time duration 9:00~10:00 (not including 10:00). Program information is information of a television program broadcast in 8:00~10:00 (not including 10:00).

Direction keys including a left key, a right key, an up key, a down key and a confirmation key are configured on the remote control; and the direction keys are used for indicating movement directions such as leftward movement, rightward movement, upward movement and downward movement of the focus when the focus moves among the different program information on the EPG page. If the direction key moves the focus to program information on the boundary of the program information region, page turning of the EPG page can be realized by triggering the direction key again. When the left key or the right key is selected, leftward or rightward page turning is realized, and a channel does not change, but time changes; and when the up key or the down key is selected, upward or downward page turning is realized, and time does not change, but the channel changes.

Figure 13:
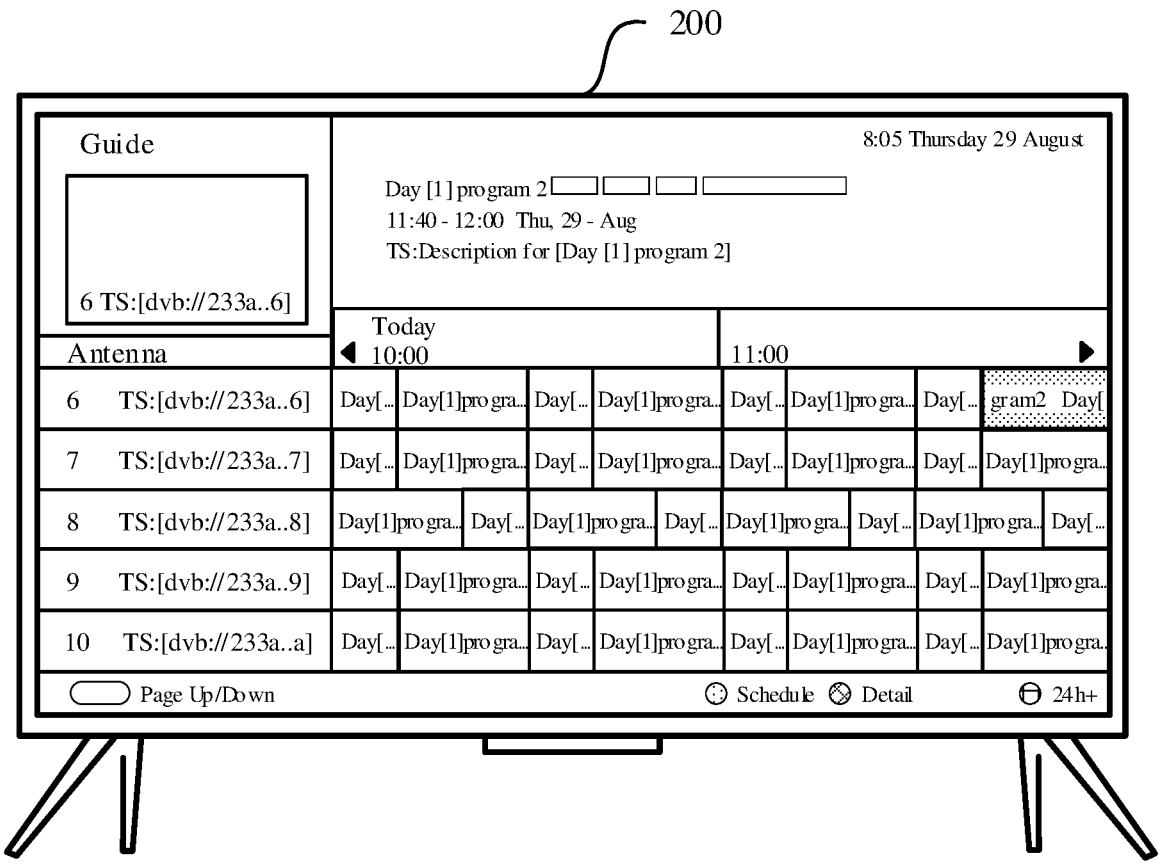
FIG. 13 shows a schematic diagram of displaying of an EPG page according to some embodiments.

FIG. 13 shows a schematic diagram of displaying of an EPG page according to some embodiments. Referring to FIG. 13, for example, a certain EPG page displays program information in a broadcast time period 10:00 to 11:00, and the current focus is located on program information on a rightmost side of a channel 6 (TS[DVB://233A.6]). If the focus is located on the rightmost side, the right key of the direction keys on the remote control is selected again to trigger a rightward page turning action, a current broadcast time period is 10:00~12:00 (not including 12:00), then a next broadcast time period displayed after page turning is 12:00~14:00 (not including 14:00), and program information corresponding to 12:00~14:00 (not including 14:00) is displayed on a new EPG page. When leftward page turning is performed, the left key of the direction keys on the remote control is selected to enable the focus to move to a leftmost side, the left key is selected again to trigger a leftward page turning action, and program information corresponding to 8:00~10:00 (not including 10:00) is displayed on a new EPG page.

The controller is connected with the display and the remote control, when the EPG page turning method is realized, the controller may realize rapid page turning based on a time length of a direction key being selected, that is, the controller controls the focus to rapidly move on each EPG page according to a long-pressing focus move instruction generated by continuously pressing any one of the direction keys on the remote control, so as to realize the rapid page turning action. When the rapid page turning action is implemented, a program information region of a new skipped EPG page does not display program information but displays merely corresponding broadcast time periods, display time of the new EPG page is shortened, operation efficiency of the user is improved, and user experience is improved.

Figure 14:
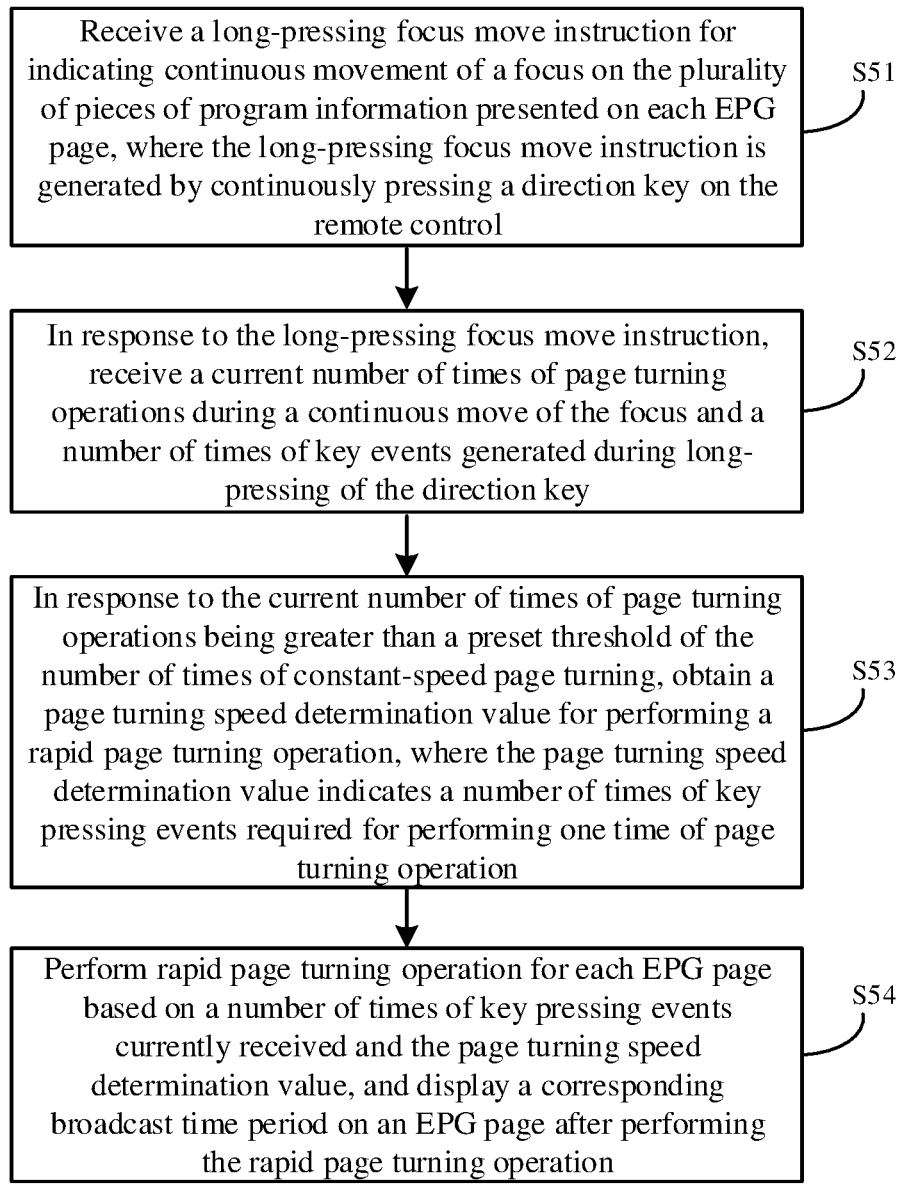
FIG. 14 shows a flowchart of a page turning method of an EPG page according to some embodiments.
Figure 15:
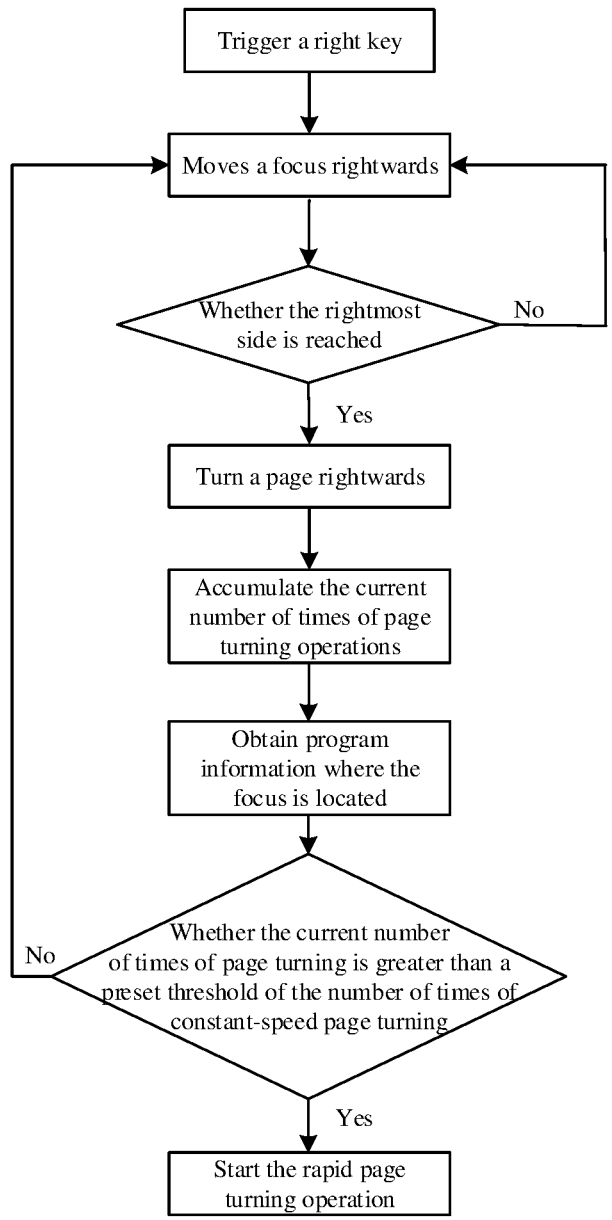
FIG. 15 shows a flowchart of a page turning method of an EPG page according to some embodiments.

FIG. 14 shows a flowchart of a page turning method of an EPG page according to some embodiments. FIG. 15 shows a flowchart of a page turning method of an EPG page according to some embodiments. The flowchart shown in FIG. 15 is an example of selecting a right key to perform the rapid page turning action. A flowchart of selecting the left key to perform the rapid page turning action is similar to the flowchart of selecting the right key. In the display apparatus according to the embodiments of the disclosure, referring to FIG. 14 and FIG. 15, when executing the page turning method of the EPG page to realize rapid page turning of the EPG page, the controller is configured to execute the following steps.

S51, receive a long-pressing focus move instruction for indicating continuous movement of a focus on the plurality of pieces of program information presented on each EPG page, where the long-pressing focus move instruction is generated by continuously pressing a direction key on the remote control.

When the user presses a direction key on the remote control, there are two modes: long pressing and short pressing. The short-pressing mode means pressing a key once and then immediately releasing the key and its pressing time is shorter than 0.1 s (or other numerical values, which may be configured as needed). When the direction key is short-pressed, the focus may be controlled to move once, that is, moving from one piece of program information to the adjacent program information. For example, if the right key is short-pressed once, the focus is controlled to move rightwards one step from current program information to program information on the right side of the current program information; and if the left key is short-pressed once, the focus is controlled to move leftwards one step from current program information to program information on the left side of the current program information.

The long-pressing mode means continuous pressing, and its pressing time exceeds 0.1 s (or other numerical values, which may be configured as needed). When the direction key is long-pressed, the focus can be controlled to move continuously, that is, moving from one piece of program information to program information farther from the one piece of program information. For example, if the right key is long-pressed, the focus is controlled to move rightwards continuously from program information where the focus is currently located till releasing the right key, and the focus stops moving. If the focus moves to a rightmost side of a current EPG page during continuous movement, page turning is executed for a first time, at the moment, the focus is located on a leftmost side of a new EPG page; then continuous moving rightwards, when the focus moves to a rightmost side of the new EPG page, page turning is executed for a second time; and the page turning operation is performed like this till the right key is released. After the right key is released, the focus lands on program information where the focus moves when the right key is released.

If the left key is long-pressed, the focus is controlled to move leftwards continuously from program information where the focus is located currently till releasing the left key, and the focus stops moving. If the focus moves to a leftmost side of the current EPG page during continuous movement of the focus, page turning is performed for a first time, at the moment, the focus is located on a leftmost side of a new EPG page; then continues moving leftwards, when the focus moves to the leftmost side of the new EPG page, page turning is performed for a second time; and the page turning action is performed like this till the left key is released. After the left key is released, the focus is located on program information where the focus holds when the left key is released.

Implementation processes of long-pressing the up key and long-pressing the down key may refer to implementation processes of long-pressing the left key and long-pressing right key, and the movement direction of the focus is a direction indicated by the direction key, which is not repeated here.

When the user presses a direction key on the remote control, whether a focus move instruction generated by pressing the direction key is a short-pressing focus move instruction or a long-pressing focus move instruction is determined firstly. The determination may be based on a time length of the direction key being pressed; if the time length is shorter than 0.1 second, it indicates the short-pressing mode which corresponds to a short-pressing focus move instruction; and if the time length exceeds 0.1 second, it indicates the long-pressing mode which corresponds to a long-pressing focus move instruction.

S52, in response to the long-pressing focus move instruction, receive a current number of times of page turning operations during a continuous move of the focus and a number of times of key events generated during long-pressing of the direction key.

The long-pressing focus move instruction is generated while the user presses a direction key on the remote control, and the controller receives the instruction continuously and controls the focus to move continuously. After receiving the long-pressing focus move instruction, the controller may obtain a current number of times of page turning triggered while the focus continuously moves and the number of times of key pressing events generated during long-pressing of the direction key while receiving the long-pressing focus move instruction. The number of times of key pressing events may be determined according to key value of the direction key, if a certain direction key is pressed down, the controller receives a "key down" event once; if the key is released, the controller receives a "key up" event; and if the key is continuously pressed, the controller receives the "key down" events continuously. In this case, the number of times of key pressing events received by the controller is the number of times of "key down" events received by the controller during continuously pressing of a certain direction key.

The current number of times of page turning indicates the number of EPG pages browsed by the focus during continuous move of the focus in a long-pressing state, namely, the total number of times of the page turning action triggered during the continuous move of the focus.

The current number of times of page turning may be determined according to the number of times of executing the page turning action when the focus moves on program information on each EPG page.

In some embodiments, when obtaining the current number of times of page turning triggered during the continuous move of the focus, the controller is further configured to perform the following steps.

Step 521, in response to the long-pressing focus move instruction, cause the focus to move through each piece of program information on a current EPG page.

Step 522, upon the focus moving to program information on a boundary of the program information region of the current EPG page, perform page turning action to cause the focus to skip from the current EPG page to a next EPG page following the current EPG page.

Step 523, accumulate a current number of times of the page turning actions triggered during the move of the focus on EPG pages.

The controller controls the focus to move to each piece of program information on the current EPG page in response to the long-pressing focus move instruction. The plurality of pieces of program information on each EPG page are arranged in several rows and several columns; the focus can move leftwards, rightwards, upwards and downwards on program information listed in the program information region; and the page turning action is triggered only when the focus reaches a leftmost side, a rightmost side, an uppermost side or a lowermost side of the program information region.

Therefore, an effective long-pressing focus move instruction may be realized by pressing the right key, the left key, the up key or the down key, so that the focus can move on program information on the same row or the same column to realize the page turning operation.

In some embodiments, taking pressing the left key or the right key as an example, if the user continuously presses the right key to generate a long-pressing focus move instruction, the controller continuously receives "key down" event of the right key, so the controller controls the focus to move rightwards on each piece of program information on the current EPG page. When the focus moves to the boundary of the program information region on the current EPG page, that is, moving to program information on the rightmost side, if "key down" event is received again, the focus skips from the current EPG page to a next EPG page following the current page, and the page turning operation is performed for a first time. Afterwards, the focus is located on program information on a leftmost side of the next EPG page, if "key down" is continuously received, the focus moves from the leftmost side to the rightmost side of the next EPG page, and the page turning operation is performed for a second time. The focus is controlled to move according to the above process, and thus the number of times of the page turning operation can be accumulated, that is, the current number of times of the page turning operation triggered during the move of the focus on EPG pages. Here, the next EPG page is an EPG page whose broadcast time period is after the broadcast time period of the current EPG page.

If the left key is continuously pressed by a user to generate a long-pressing focus move instruction, the controller continuously receives "key down" event of the left key, and the controller controls the focus to move leftwards on each piece of program information on the current EPG page. When the focus moves to the boundary of the program information region on the current EPG page, that is, moving to program information on the leftmost side, if the "key down" event is received again, the focus skips from the current EPG page to a next EPG page, and the page turning operation is performed for a first time. Afterwards, when the focus is located on program information on a leftmost side of the next EPG page, if "key down" event is continuously received, the page turning operation is performed for a second time. The focus is controlled to move according to the above process, and thus the number of times of performing the page turning operation can be accumulated, that is, the current number of times of the page turning operation triggered during the move of the focus on EPG pages. Here, the next EPG page is an EPG page whose broadcast time period is before the broadcast time period of the current EPG page.

S53, in response to the current number of times of page turning operations being greater than a preset threshold of the number of times of constant-speed page turning, obtain a page turning speed determination value for performing a rapid page turning operation, where the page turning speed determination value indicates a number of times of key pressing events required for performing one time of page turning operation.

In order to prevent excessively fast page turning at a starting stage of rapid page turning, which is unfavorable for the user to accurately position a particular page, in some embodiments, the preset threshold of the number of times of constant-speed page turning is configured, so that the rapid page turning operation is performed after the page turning operation is performed several times at a normal speed. In this way, a page turning speed is low at the starting stage of page turning, but with increase of the key pressing time, the page turning speed is accelerated gradually.

In order to accurately determine when to perform the rapid page turning operation, the current number of times of page turning operations is compared with a preset threshold of the number of times of page turning operations, and the preset threshold of the number of times of page turning operations indicates a number of times of performing the page turning operations at a normal speed. In some embodiments, the preset threshold of the number of times of page turning operation may be configured to be twice, that is, after the page turning operation is performed twice at the normal speed, the rapid page turning action is performed starting with a third page.

The preset threshold of the number of times of page turning operations is configured in order to accurately determine an intention of the user, that is, whether the user intends to rapidly move the focus or rapidly turn pages by long-pressing the direction keys. Therefore, when the direction keys are long-pressed, and the focus skips from a first page to a second page and from the second page to the third page, rapid page turning is not trigged immediately but the page turning operation is performed twice at the normal speed; and it is considered that the user intends to rapidly turn pages only when the focus skips to the third page.

When the current number of times of page turning operations is smaller than the preset threshold of the number of times of constant-speed page turning, page turning is performed at a normal page turning speed, and program information where the focus is located currently is obtained and displayed every time one page is turned.

When the current number of times of page turning operations is greater than the preset threshold of the number of times of constant-speed page turning, the rapid page turning operation starts to be performed, and during the rapid page turning, a process of obtaining and displaying the program information where the focus is located currently every time one page is turned is not performed any more. When the rapid page turning operation is performed, the corresponding page turning speed determination value for performing the rapid page turning operation is used, and the page turning speed determination value indicates a number of times of key pressing events required for implementing one time of page turning operation. For example, every time the controller receives "key down" events M times, the number of times of key pressing events received is M, that is, the page turning operation is performed once. Rapid page turning is performed by using the page turning speed determination value, that is, a purpose of gradually accelerating the page turning speed with increase of key pressing time may be realized.

The page turning speed determination value indicates a magnitude of the page turning speed; and the larger the page turning speed determination value is, the lower the page turning speed becomes. For example, when the page turning speed determination value is 4, the page turning operation is performed once only when the number of times of key pressing events received is 4; and when the page turning speed determination value is 3, the page turning operation is performed once only when the number of times of key pressing events received is 3. Therefore, a page turning speed when the page turning speed determination value is 4 is lower than a page turning speed when the page turning speed determination value is 3.

At the starting stage of rapid page turning, the page turning speed is lower, that is, the page turning speed determination value is larger, and it can be guaranteed that if the broadcast time period on the current EPG page is close to a target broadcast time period of an EPG page that a user desires, slow page turning is beneficial for accurate positioning for the user. Long-time key pressing indicates that the user intends to position an EPG page farther from the current broadcast time period, and the page turning speed is gradually accelerated.

S54, perform rapid page turning operation for each EPG page based on a number of times of key pressing events currently received and the page turning speed determination value, and display a corresponding broadcast time period on an EPG page after performing the rapid page turning operation.

After the page turning speed determination value is obtained, the rapid page turning action may be performed for each EPG page according to a number of times of key pressing events currently received. The page turning speed determination value corresponds to the number of times of key pressing events received for implementing page turning action once, so when the number of times of key pressing events currently received by the controller is the same as the number of times of key pressing events required for the page turning speed determination value, or when the number of times of key pressing events currently received may be divided evenly by the number of times of key pressing events required for the page turning speed determination value, the rapid page turning operation may be performed.

Figure 16:
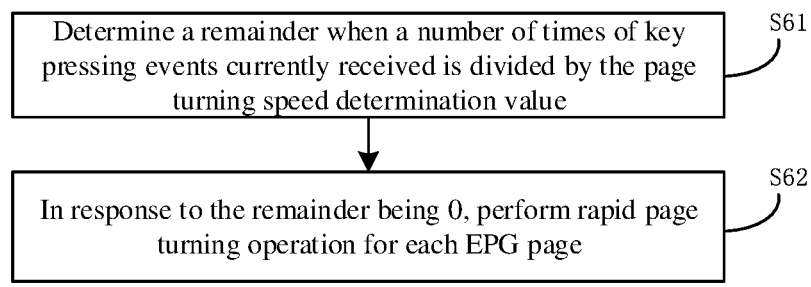
FIG. 16 shows a flowchart of a method for performing a rapid page turning operation according to some embodiments.
Figure 17:
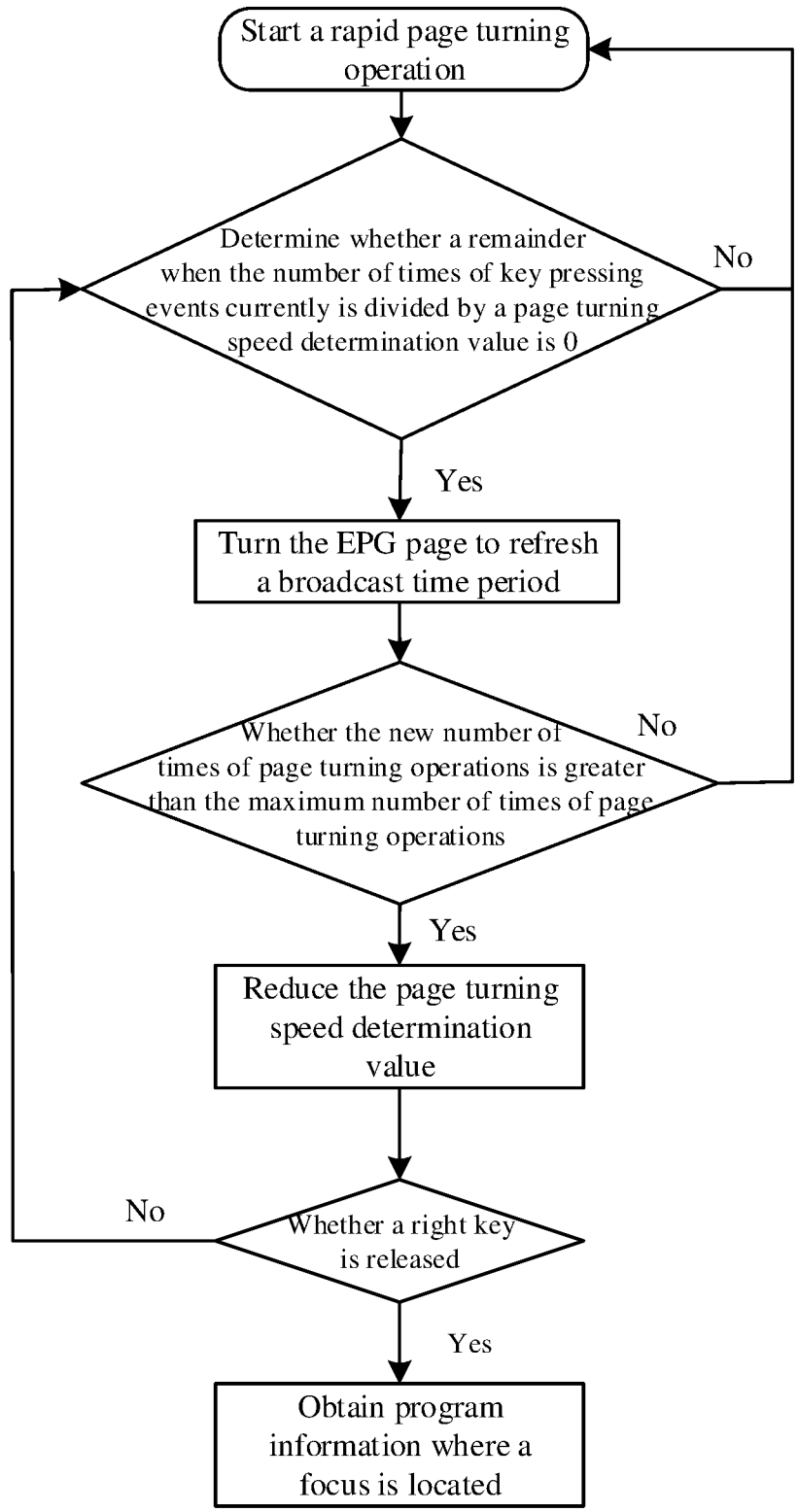
FIG. 17 shows a flowchart for performing a rapid page turning operation according to some embodiments.

FIG. 16 shows a flowchart of a method for performing a rapid page turning operation according to some embodiments. FIG. 17 shows a flowchart of performing a rapid page turning operation according to some embodiments. The flowchart shown in FIG. 17 is an example of pressing the right key to perform the rapid page turning operation. In some embodiments, referring to FIG. 16 and FIG. 17, when whether the number of times of key pressing events received by the controller is the same as the number of times of key pressing events which needs to be received and corresponds to the page turning speed determination value is determined, while performing the rapid page turning operation for each EPG page based on the current received number of times of key pressing events and the page turning speed determination value, the controller is further configured to perform the following steps.

S61, determine a remainder when a number of times of key pressing events currently received is divided by the page turning speed determination value.

S62, in response to the remainder being 0, perform rapid page turning operation for each EPG page.

The longer the time when a direction key is continuously pressed, the larger the number of times of key pressing events currently received by the controller becomes. The remainder when the number of times of key pressing events currently received is divided by the page turning speed determination value is calculated every time the controller receives the number of times of key pressing events, that is, the remainder is determined from the number of times of key pressing events currently received divided by the page turning speed determination value.

For example, the number of times of key pressing events currently received is 6, the page turning speed determination value is 4, so the remainder is determined like this: 6±4=1 2, that is, the remainder is 2; and if the number of times of key pressing events currently received is 8, the page turning speed determination value is 4, so the remainder is taken like this: 8±4=2 0, that is, the remainder is 0.

If the remainder is 0, it can be determined that the number of times of key pressing events currently received by the controller is the same as the number of times of key pressing events which needs to be received and corresponds to the page turning speed determination value, or the number of times of key pressing events currently received may be divided by the number of times of key pressing events required for the page turning speed determination value with no remainder, so the rapid page turning operation may be performed for each EPG page. Here, the EPG pages for performing the rapid page turning operations do not include an EPG page corresponding to page turning at the normal speed, that is, do not include an EPG page for performing page turning operation according to the preset threshold of the number of times of page turning operation.

When rapid page turning is performed, in order to reduce display time of a new EPG page and improve operation efficiency of the user, the program information region of the new EPG page does not display program information any more but displays merely the corresponding broadcast time period. When performing the rapid page turning operation for each EPG page, the controller is further configured to perform the following steps.

Step 621, skip from a current EPG page presented on the display to a next EPG page according to the page turning speed determination value.

Step 622, obtain a next broadcast time period on the next EPG page.

Step 623, present the next broadcast time period on a program information region of the next EPG page.

If the remainder when the number of times of key pressing events currently received by the controller is divided by the page turning speed determination value is 0, the rapid page turning operation is performed according to a page turning speed corresponding to the page turning speed determination value, that is, the current EPG page presented on the display is skipped to a next EPG page. If the user continuously presses the right key, that is, the rapid page turning operation is performed rightwards, the page turning speed determination value is 4, and it indicates that page turning of the EPG pages is performed once every time the controller receives four times of "key down" events of the right key. So if the current focus is located on the third EPG page, and the controller receives four times of "key down" events of the right key, then the display skips from the third EPG page to a fourth EPG page. If the controller receives four times of "key down" events of the right key again, the display skips from the fourth EPG page to a fifth EPG page. Here, the next EPG page in response to long-pressing of the right key is a page whose broadcast time period is after the broadcast time period of the current EPG page.

If the user continuously presses the left key, that is, the rapid page turning operation is performed leftwards, the page turning speed determination value is 4, and it indicates that page turning of the EPG pages is performed once every time the controller receives four times of "key down" events of the left key. So if the current focus is located on the third EPG page, and the controller receives four times of "key down" events of the left key, then the display skips from the third page to the second EPG page. If the controller receives four times of "key down" events of the left key again, the display skips from the second EPG page to the first EPG page. Here, the next EPG page in response to long-pressing of the left key is a page whose broadcast time period is before the broadcast time period of the current EPG page.

During rapid page turning, specific program information of an EPG page currently displayed is not obtained, merely the broadcast time period of the EPG page currently displayed is refreshed.

Figure 18:
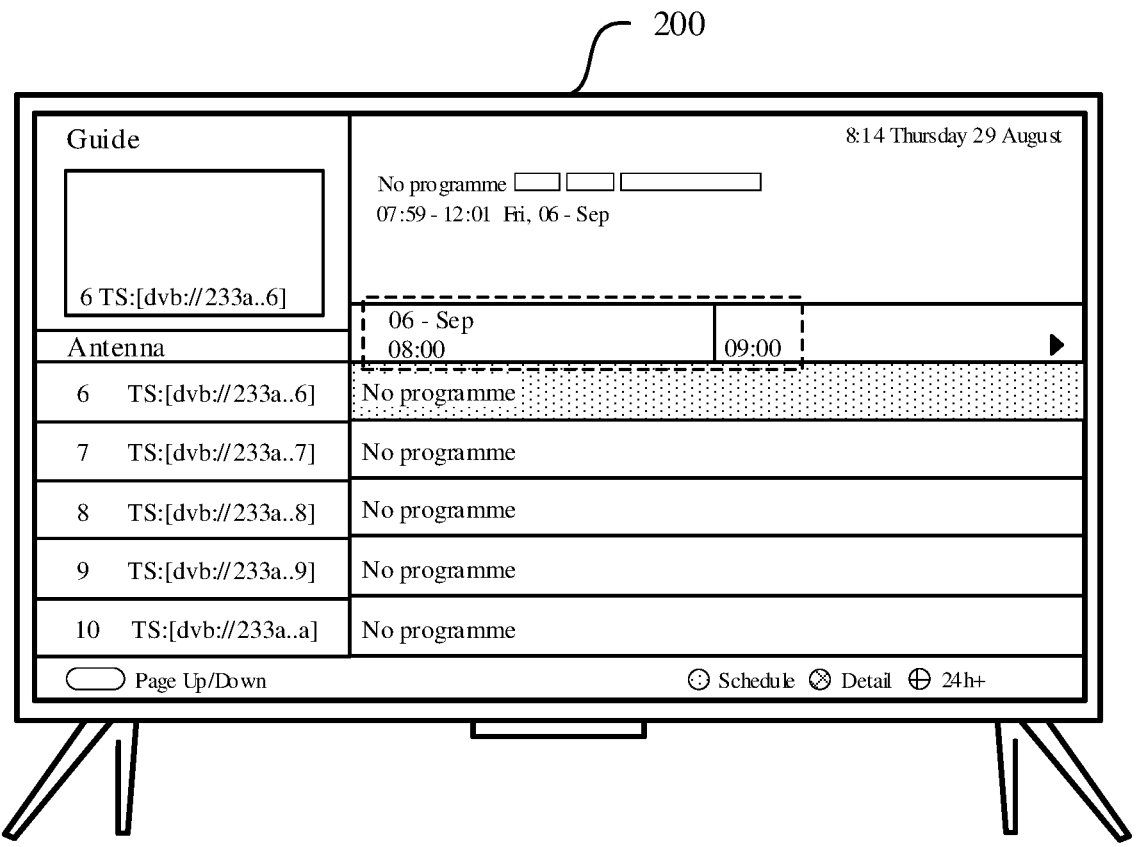
FIG. 18 shows a schematic diagram of an EPG page where merely broadcast time period is refreshed according to some embodiments.

FIG. 18 shows a schematic diagram of an EPG page where merely a broadcast time period is refreshed according to some embodiments. Referring to FIG. 18, if long-pressing of the right key causes rightward rapid page turning action, the next EPG page is the fourth EPG page, a broadcast time period corresponding to the fourth EPG page is obtained, for example, 8:00~10:00 (displayed starting times is 8:00 and 9:00), that is, time in a white dotted-line box shown in FIG. 18, which is presented on a program information region corresponding to the fourth EPG page, to realize a purpose of merely refreshing the broadcast time period.

When performing rapid page turning, a broadcast time period of each new skipped EPG page may be determined according to an initial displayed broadcast time period and the number of times of page turning, and thus, in some embodiments, when obtaining the next broadcast time period corresponding to the next EPG page, the controller is further configured to perform the following steps.

Step 6221, the current broadcast time period presented on the program information region of the current EPG page is obtained.

Step 6222, the next broadcast time period corresponding to a next EPG page is calculated based on the current broadcast time period and a new number of times of page turning operation after the rapid page turning operation are performed.

The current broadcast time period corresponding to the current EPG page where the rapid page turning operation starts is obtained, and a display time length corresponding to the broadcast time period may be set to be two hours. In other words, if long-pressing of the right key causes the rightward rapid page turning operation, the broadcast time period is postponed by two hours every time one page turning operation is performed; and if long-pressing of the left key causes the leftward rapid page turning operation, the broadcast time period is brought forward by two hours every time one page turning operation is performed.

For example, if the current broadcast time period is 8:00~10:00, and a corresponding new number of times of page turning operation by rightwards performing the rapid page turning operation is 2, then the broadcast time period is postponed by four hours, so the next broadcast time period corresponding to the next EPG page is 12:00~14:00. If the current broadcast time period is 8:00~10:00, and a corresponding new number of times of page turning by leftwards performing rapid page turning operation is 1, then the broadcast time period is brought forward by two hours, so the next broadcast time period corresponding to the next EPG page is 6:00~8:00. The above time ranges do not include a right interval value.

Therefore, in the display apparatus according to the embodiments of the disclosure, when a direction key is continuously pressed, a number of times of key pressing events currently received and a current number of times of page turning operations in the process are determined; and when the current number of times of page turning operations reaches a preset threshold of the number of times of page turning operations, rapid page turning operation starts. The page turning speed determination value is obtained, and if the remainder when the number of times of key pressing events currently received is divided by the page turning speed determination value is 0, a rapid page turning operation is performed, that is, the current EPG page is skipped to a next EPG page. When rapid page turning operation is performed, a program information region of a new skipped EPG page does not display program information but displays merely a corresponding broadcast time period, so that the time required for displaying of the new EPG page is shortened, operation efficiency of the user is improved, and user experience is improved.

The rapid page turning operation may be implemented by using the page turning speed determination value, and in order to realize gradually accelerating the page turning speed with increasing of key pressing time, the page turning speed determination value needs to be adjusted.

Figure 19:
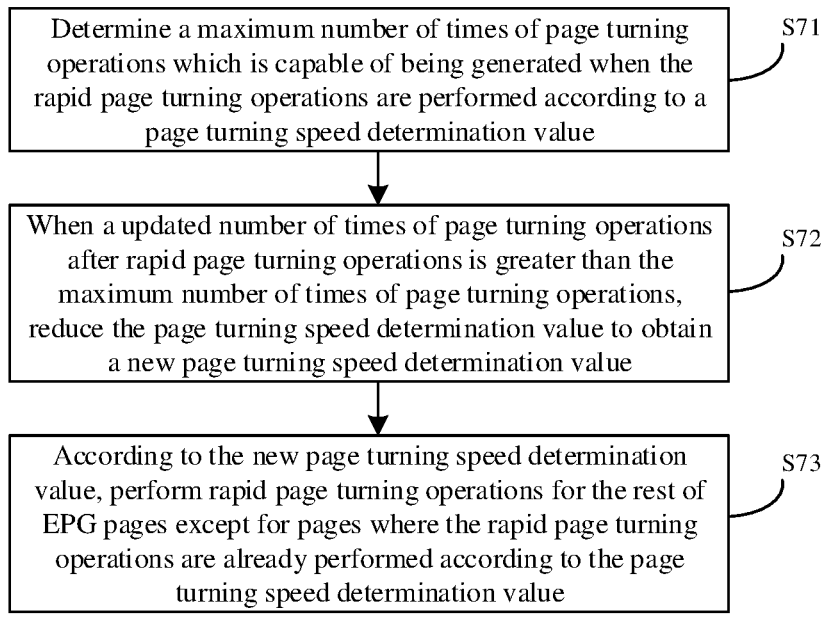
FIG. 19 shows a flowchart of a method for adjusting a page turning speed determination value according to some embodiments.

FIG. 19 shows a flowchart of a method for adjusting a page turning speed determination value according to some embodiments. Referring to FIG. 17 and FIG. 19, in a display apparatus according to some embodiments, based on the page turning method of the EPG page in the display apparatus according to the above embodiments, when adjusting the page turning speed determination value, the controller is further configured to perform the following steps.

S71, determine a maximum number of times of page turning operations which is capable of being generated when the rapid page turning operations are performed according to a first page turning speed determination value.

S72, when a updated number of times of page turning operations after rapid page turning operations is greater than the maximum number of times of page turning operations, reduce the first page turning speed determination value to obtain a second page turning speed determination value.

S73, according to the second page turning speed determination value, perform rapid page turning operations for the rest of EPG pages except for pages where the rapid page turning operations are already performed according to the first page turning speed determination value.

When the rapid page turning operation is executed, a plurality of different page turning speed determination values may be configured. The page turning speed determination value is negatively related to the page turning speed, at the starting stage of rapid page turning operation, rapid page turning may be performed according to an initial page turning speed determination value; after condition for a maximum number of times of page turning is met, a second page turning speed determination value may be used for performing rapid page turning; and the second page turning speed determination value is smaller than the initial page turning speed determination value, so that the page turning speed is gradually accelerated.

The maximum number of times of page turning is a maximum number of times of page turning operation performed for a certain page turning speed determination value. The maximum numbers of times of page turning corresponding to different page turning speed determination values are different, and may increase gradually. For example, the initial page turning speed determination value may be set to be 4 (four times of key pressing events required for implementing one time of page turning operation), and for this page turning speed determination value, five times of the page turning operation may be performed; and the second page turning speed determination value is 3 (three times of key pressing events required for implementing one time of page turning operation), and for this page turning speed determination value, six times of the page turning action may be performed.

Therefore, in order to conveniently determine a next page turning speed determination value, the maximum number of times of page turning which can be generated based on a page turning speed determination value adopted when the rapid page turning action has been performed, may be determined firstly. During rapid page turning operations, the number of times of the page turning operations is accumulated; and for a current page turning speed determination value, the accumulated number of times of page turning after a rapid page turning operation is a new number of times of page turning operations. That is, the new number of times of page turning operations corresponds to merely the current page turning speed determination value adopted when the rapid page turning action is executed currently, and the new numbers of times of page turning operations corresponding to the different page turning speed determination values are accumulated again.

The new number of times of page turning operations is compared with the maximum number of times of page turning operations; and if the new number of times of page turning operations is greater than the maximum number of times of page turning operations, it indicates that the number of times of page turning operations generated according to a current page turning speed determination value reaches a maximum value. In this case, the page turning speed may be increased, that is, the page turning speed determination value is reduced, and the new page turning speed determination value is determined.

For example, if the page turning speed determination value adopted for executing rapid page turning currently is 4, for this page turning speed determination value, 5 times of the page turning operations may be performed. Then the new number of times of page turning operations is compared with 5, if the new number of times of page turning operations is greater than 5, it means that 5 times of the page turning operations have been performed when rapid page turning is performed at a speed based on the page turning speed determination value of 4, the page turning speed may be improved, the page turning speed determination value is reduced, and the new page turning speed determination value is 3.

A initial value of the page turning speed determination value is negatively related to the page turning speed, and a numerical value of the page turning speed determination value is reduced with increasing of the number of times of page turning operations, which may be set to be reduced by 1 each time, so that the number of times of key pressing events required for one time of page turning operation is fewer, to increase the page turning speed.

After new page turning speed determination value is determined, according to the new page turning speed determination value, the rapid page turning operation may be performed for the rest of all EPG pages except for pages where the rapid page turning operation is already performed according to a previous page turning speed determination value. For example, if 5 times of the page turning operations are performed when the page turning speed determination value is 4, the display skips from a third EPG page to an eighth EPG page; and then the page turning speed determination value is reduced, rapid page operation continues to be performed according to the new page turning speed determination value 3, it starts from a ninth EPG page with the new page turning speed determination value currently, and a page presented on the display is skipped from the ninth EPG page to a fifteenth EPG page after six times of the page turning operations.

Therefore, for a same page turning speed determination value, if the accumulated new number of times of page turning operations exceeds the maximum number of times of page turning operations based on a current page turning speed determination value, the page turning speed determination value is adjusted, that is, a numerical value of the page turning speed determination value is reduced by 1, so that the page turning speed is adjusted. In some embodiments, the page turning speed determination value may be set to be 4, 3, 2 or 1, and when the page turning speed determination value is 1, the maximum page turning speed may be realized.

During rapid page turning for each EPG page, at the starting stage of starting rapid page turning, the page turning speed is low, it can be guaranteed that if the broadcast time period of a current EPG page is close to the target broadcast time period of an EPG page that a user desires, slow page turning is beneficial for accurate position. Long-time key pressing indicates that the user intends to position an EPG page farther from the current broadcast time period, and the page turning speed is gradually accelerated. Therefore, with increasing of continuously key-pressing time, when a maximum number of times of page turning supported for a page turning speed determination value is met, the page turning speed determination value is reduced, so that the page turning speed is increased, and the purpose of gradually accelerating the page turning speed is realized.

The user continuously presses a direction key, so the rapid page turning operation may be started, and a broadcast time period is refreshed and presented in real time in the program information region of the EPG page currently presented on the display. The termination of rapid page turning is determined by whether a release of the direction key is detected during pressing of the direction key, and when the user releases the direction key, a release instruction is generated.

In some embodiments, after a release action of the direction key is detected, the controller is further configured to:

Step 81, determine whether a releasing instruction for releasing the direction key is received;

Step 82, in response to the releasing instruction, stop the rapid page turning operation, and obtain program information corresponding to an EPG page currently presented on the display; and Step 83, update the EPG page currently presented on the display to include the program information in the program information region of the EPG page.

The controller monitors whether the releasing instruction is generated in real time; when the controller receives the releasing instruction, it indicates that the user currently locate a broadcast time period he/she intends to check; the rapid page turning operation needs to stopped immediately; and the broadcast time period currently presented on the display is the broadcast time period the user intends to check.

Afterwards, the controller calls an interface from the middleware layer and calls program information of the EPG page corresponding to the broadcast time period, and displays the program information on the program information region of the EPG page currently displayed on the display.

Therefore, in the display apparatus according to the embodiments of the disclosure, during the rapid page turning process, program information of corresponding EPG pages is not obtained in real time, but program information corresponding to the EPG page currently presented on the display is obtained merely after the rapid page turning operation is stopped. The step of obtaining program information is performed only after finishing the rapid page turning operation, so that a time required for displaying the new EPG page may be shortened, the operation efficiency of the user is improved, and user experience is improved.

It can be seen from the above technical solutions that in the display apparatus according to the embodiments of the disclosure, the long-pressing focus move instruction generated by continuously pressing a direction key on the remote control is received, and a current number of times of page turning operations in the focus moving process and a number of times of key pressing events during continuously pressing of the direction key are obtained; and a page turning speed determination value for implementing rapid page turning operation is obtained when the current number of times of page turning operations is greater than a preset threshold of the number of times of constant-speed page turning operations; the rapid page turning operation is performed for each EPG page based on a number of times of key pressing events currently received and the page turning speed determination value; and a broadcast time period is displayed on an EPG page after performing the rapid page turning operation. Therefore, in the display apparatus according to the embodiments of the disclosure, when the current number of times of page turning operations meets the preset threshold of the number of times of constant-speed page turning operations, the rapid page turning operation is performed; and during the rapid page turning process, the program information region of a new EPG page does not display program information but displays merely corresponding broadcast time period, so that the time required for displaying the new EPG page is shortened, the operation efficiency of the user is improved, and the user experience is improved.

It is noted that an implementation process of rapid page turning is described merely taking continuously pressing the right key as an example in the above embodiments, and implementation of rapid page turning operation by continuously pressing the left key, the up key and the down key are similar to that of the right key, which is not repeated here.

FIG. 14 shows a flowchart of a page turning method of an EPG page according to some embodiments. Referring to FIG. 14, the disclosure further provides a page turning method of an EPG page, which is executed by a controller configured in the display apparatus according to the above embodiments. The method includes the following steps.

SM, receive a long-pressing focus move instruction for indicating continuous move of a focus through on a plurality of pieces of program information presented on each EPG page, where the long-pressing focus move instruction is generated by continuously pressing a direction key on a remote control.

S52, in response to the long-pressing focus move instruction, receive a current number of times of page turning operations during the continuous move of the focus and a number of times of key pressing events generated during long-pressing of the direction key.

S53, in response to the current number of times of page turning operations being greater than a preset threshold of the number of times of constant-speed page turning, obtain a page turning speed determination value for performing a rapid page turning operation, where the page turning speed determination value indicates a number of times of key pressing events required for performing one time of page turning operation.

S54, perform rapid page turning operation for each EPG page based on a number of times of key pressing events currently received and the page turning speed determination value, and display a corresponding broadcast time period on an EPG page after performing the rapid page turning operation.

In some embodiments of the disclosure, an operation of the rapid page turning for each EPG page based on a number of times of key pressing events currently received and the page turning speed determination value includes:

calculating a remainder when the number of times of key pressing events currently received is divided by the page turning speed determination value; and performing the rapid page turning operation for each EPG page when the remainder is 0.

In some embodiments of the disclosure, the method further includes:

obtaining a maximum number of times of page turning operations which is capable of being generated when the rapid page turning operations are performed according to the page turning speed determination value;

reducing the page turning speed determination value to obtain a new page turning speed determination value when the a updated number of times of page turning operations after rapid page turning operations is greater than the maximum number of times of page turning operations; and according to the new page turning speed determination value, performing rapid page turning operations for the rest of EPG pages except for pages where rapid page turning operations have been performed according to the page turning speed determination value.

In specific implementations, the disclosure further provides a computer storage medium. The computer storage medium may store programs. When the programs are executed, a part or all of steps in all embodiments of the page turning method of the EPG page provided by the disclosure are performed. The storage medium may be a diskette, an optical disc, a ROM or a RAM and the like.

Those skilled in the art can clearly understand that the embodiments of the disclosure may be implemented by combining software and a general-purpose hardware platform. Based on this understanding, the technical solutions in the embodiments of the disclosure may be embodied essentially in a form of a software product or a part of the technical solutions making a contribution with respect to the prior art may be embodied in a form of a software product. The computer software product may be stored in the storage medium, such as an ROM/RAM, a diskette and an optical disc, include a plurality of instructions used for enabling a computer device (may be a personal computer, a server or a network device, etc.) to perform the method of each embodiment or some parts of the embodiments of the disclosure.

The same or similar parts among the various embodiments in the specification may refer to one another. Especially, as for the embodiments of the page turning method of the EPG page, the embodiments of the page turning method is basically similar to the embodiments of the display apparatus, so description of the embodiments of the page turning method is simpler, related portions may refer to description in the embodiments of the display apparatus.

For convenient explanation, the above description is already made in combination with the specific implementations. However, the above exemplary discussion is not intended to exhaust or limit the implementations to the specific forms of the disclosure. Various modifications and transformations can be obtained according to the above teachings. Selection and description of the above implementations are for better explaining a principle and actual applications, so that those skilled in the art can better use the implementations and adapt to specifically using various different transformed implementations.

What is claimed is:

1. A display apparatus, comprising:
   a display, configured to display a video and an electronic program guide (EPG) page, wherein the EPG page comprises a broadcast time period, one or more channels and one or more programs;
   a remote control, wherein the remote control comprises a plurality of keys, and the plurality of keys comprises one or more direction keys, wherein the remote control is configured to operate the EPG page by controlling moving of a focus; and
   a controller connected with the display and configured to:
   in response to an instruction from the remote control for presenting the EPG page, obtain a schedule list and display information of one or more target programs on a target EPG page presented on the display, wherein the schedule list comprises information of one or more scheduled programs;
   determine whether there is a schedule conflict based on the display information of the one or more target programs on the target EPG page and the information of the one or more scheduled programs in the schedule list; wherein the information of the one or more scheduled programs comprises one or more schedule time intervals and a set of schedule channels, and the display information of the one or more target programs comprises a target broadcast time period and a set of target channels;
   determine a specific channel and a specific time period corresponding to the schedule conflict in response to the schedule conflict existing; and
   obtain a schedule identifier corresponding to the specific channel within the specific time period, and display the schedule identifier on specific program information of the specific channel; wherein the schedule identifier indicates an identifier of the specific program information, wherein the controller is further configured to:
   receive a long-pressing focus move instruction for indicating continuous movement of a focus on the one or more programs presented on the target EPG page, wherein the long-pressing focus move instruction is generated by continuously pressing a first direction key of the one or more direction keys;
   in response to the long-pressing focus move instruction, control the focus to continuously move through the one or more programs on the target EPG page according to a first direction indicated by the first direction key;
   control the focus to move through the one or more programs on the target EPG page at a first constant speed according to a first direction indicated by the first direction key;
   upon the focus moving to a boundary of the target EPG page, skip to an EPG page following the target EPG page along the first direction;
   in response to the long-pressing focus move instruction, determine a current number of times of page turning operations during a continuous move of the focus and a number of times of key pressing events generated during long-pressing of the first direction key;
   in response to the current number of times of page turning operations being greater than a preset threshold of a number of times of constant-speed page turning, obtain a page turning speed determination value for performing a rapid page turning operation;
   wherein the page turning speed determination value indicates a number of times of key pressing events required for performing one time of rapid page turning operation.

2. The display apparatus according to claim 1, wherein the controller is further configured to:
   determine, in the schedule list, one or more target schedule time intervals corresponding to the target broadcast time period on the target EPG page and a set of target schedule channels corresponding to the set of target channels; wherein the one or more target schedule time intervals are a portion of the one or more schedule time intervals;
   determine whether the set of target schedule channels in the schedule list has a schedule channel within the one or more target schedule time intervals;
   determine that there is the schedule conflict in response to the set of target schedule channels having the schedule channel; and
   determine that there is no schedule conflict in response to the set of target schedule channels having no schedule channel.

3. The display apparatus according to claim 2, wherein the controller is further configured to:
   obtain one or more program broadcast time periods corresponding to the set of target channels within the target broadcast time period;
   determine, within the one or more target schedule time intervals, whether there is a first target schedule time interval having an overlap with any one of the one or more program broadcast time periods;
   determine that the set of target schedule channels has the schedule channel in response to the first target schedule time interval existing; and
   determine that the set of target schedule channels has no schedule channel in response to the first target schedule time interval not existing.

4. The display apparatus according to claim 1, wherein the controller is further configured to:
   obtain the specific channel corresponding to the schedule conflict and a schedule time of at least one program on the specific channel in response to the schedule conflict existing;
   obtain a schedule initial time of a scheduled program ranked first in the specific channel according to time order and an schedule end time of a scheduled program ranked last in the specific channel according to time order; and
   generate the specific time period corresponding to the specific channel based on the schedule initial time and the schedule end time.

5. The display apparatus according to claim 1, wherein the page turning speed determination value is negatively related to a speed of the rapid page turning operation.

6. The display apparatus according to claim 1, wherein the controller is further configured to:
   calculate a remainder when the number of times of key pressing events generated during long-pressing of the first direction key is divided by the page turning speed determination value; and
   perform a rapid page turning operation when the remainder is 0.

7. The display apparatus according to claim 6, wherein the controller is further configured to:
during the rapid page turning operation, merely display a broadcast time period of a new skipped EPG page, and not display program information corresponding to broadcast time period of the new skipped EPG page.

8. The display apparatus according to claim 6, wherein the controller is further configured to:
receive a release instruction for releasing the first direction key, and stop the rapid page turning operation; and
determine a broadcast time period of a second EPG page currently presented on the display; and
obtain program information corresponding to the broadcast time period of the second EPG page; and
update the second EPG page currently presented on the display to comprise the program information corresponding to the broadcast time period of the second EPG page.

9. A display method for a display apparatus, comprising:
in response to an instruction from a remote control of the display apparatus for presenting a target electronic program guide (EPG) page on a display of the display apparatus, obtaining a schedule list and display information of one or more target programs on a target EPG page presented on the display, wherein the schedule list comprises information of one or more scheduled programs;
determining whether there is a schedule conflict based on the display information of the one or more target programs on the target EPG page and the information of the one or more scheduled programs in the schedule list; wherein the information of the one or more scheduled programs comprises one or more schedule time intervals and a set of schedule channels, and the display information of the one or more target programs comprises a target broadcast time period and a set of target channels;
determining a specific channel and a specific time period corresponding to the schedule conflict in response to the schedule conflict existing; and
obtaining a schedule identifier corresponding to the specific channel within the specific time period, and displaying the schedule identifier on specific program information of the specific channel; wherein the schedule identifier indicates an identifier of the specific program information;
wherein the remote control comprises a plurality of keys, and the plurality of keys comprises one or more direction keys, wherein the remote control is configured to operate the EPG page by controlling moving of a focus, wherein the method further comprises:
receiving a long-pressing focus move instruction for indicating continuous movement of a focus on one or more programs presented on the target EPG page, wherein the long-pressing focus move instruction is generated by continuously pressing a first direction key of the one or more direction keys;
in response to the long-pressing focus move instruction, controlling the focus to continuously move through the one or more programs on the target EPG page according to a first direction indicated by the first direction key,
controlling the focus to move through the one or more programs on the target EPG page at a first constant speed according to a first direction indicated by the first direction key;
upon the focus moving to a boundary of the target EPG page, skipping to an EPG page following the target EPG page along the first direction;
in response to the long-pressing focus move instruction, determining a current number of times of page turning operations during a continuous move of the focus and a number of times of key pressing events generated during long-pressing of the first direction key; and
in response to the current number of times of page turning operations being greater than a preset threshold of a number of times of constant-speed page turning, obtaining a page turning speed determination value for performing a rapid page turning operation;
wherein the page turning speed determination value indicates a number of times of key pressing events required for performing one time of rapid page turning operation.

10. The display method according to claim 9, wherein the method further comprises:
determining, in the schedule list, one or more target schedule time intervals corresponding to the target broadcast time period on the target EPG page and a set of target schedule channels corresponding to the set of target channels; wherein the one or more target schedule time intervals are a portion of the one or more schedule time intervals;
determining whether the set of target schedule channels in the schedule list has a schedule channel within the one or more target schedule time intervals;
determining that there is the schedule conflict in response to the set of target schedule channels having the schedule channel; and
determining that there is no schedule conflict in response to the set of target schedule channels having no schedule channel.

11. The display method according to claim 10, wherein the method further comprises:
obtaining one or more program broadcast time periods corresponding to the set of target channels within the target broadcast time period;
determining, within the one or more target schedule time intervals, whether there is a first target schedule time interval having an overlap with any one of the one or more program broadcast time periods;
determining that the set of target schedule channels has the schedule channel in response to the first target schedule time interval existing; and
determining that the set of target schedule channels has no schedule channel in response to the first target schedule time interval not existing.

12. The display method according to claim 9, wherein the method further comprises:
obtaining the specific channel corresponding to the schedule conflict and a schedule time of at least one program on the specific channel in response to the schedule conflict existing;
obtaining a schedule initial time of a scheduled program ranked first in the specific channel according to time order and an schedule end time of a scheduled program ranked last in the specific channel according to time order; and
generating the specific time period corresponding to the specific channel based on the schedule initial time and the schedule end time.

13. The display method according to claim 9, wherein the page turning speed determination value is negatively related to a speed of the rapid page turning operation.

14. The display method according to claim 9, wherein the method further comprises:

calculating a remainder when the number of times of key pressing events generated during long-pressing of the first direction key is divided by the page turning speed determination value; and performing a rapid page turning operation when the remainder is 0.

\* \* \* \* \*